(12) United States Patent
Whitlock et al.

(10) Patent No.: US 12,197,399 B2
(45) Date of Patent: *Jan. 14, 2025

(54) MANAGING AND CLASSIFYING ASSETS IN AN INFORMATION TECHNOLOGY ENVIRONMENT USING TAGS

(71) Applicant: Tripwire, Inc., Portland, OR (US)

(72) Inventors: David M. Whitlock, Portland, OR (US); Mark A. Little, Milwaukie, OR (US); Julie Booth, Portland, OR (US); Chyna Trople, Portland, OR (US)

(73) Assignee: TRIPWIRE, INC., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/314,071

(22) Filed: May 8, 2023

(65) Prior Publication Data
US 2023/0359595 A1 Nov. 9, 2023

Related U.S. Application Data

(60) Division of application No. 15/925,436, filed on Mar. 19, 2018, now Pat. No. 11,645,246, which is a (Continued)

(51) Int. Cl.
*G06F 16/21* (2019.01)
*G06F 16/11* (2019.01)
(Continued)

(52) U.S. Cl.
CPC .............. *G06F 16/21* (2019.01); *G06F 16/11* (2019.01); *G06F 16/2291* (2019.01); *H04L 41/085* (2013.01)

(58) Field of Classification Search
CPC ....................................................... G06F 16/21
(Continued)

(56) References Cited

U.S. PATENT DOCUMENTS 7,243,348 B2 7/2007 Good et al.
7,316,016 B2 1/2008 Difalco
(Continued)

OTHER PUBLICATIONS

Kim et al., "The Design and Implementation of Tripwire: A File System Integrity Checker," Computer Science Technical Reports, Report No. 93-071, 23 pp. (Nov. 1993).
(Continued)

*Primary Examiner* — Syling Yen
(74) *Attorney, Agent, or Firm* — Fredrikson & Byron, P.A.

(57) ABSTRACT

Disclosed below are representative embodiments of methods, apparatus, and systems for managing and classifying assets in an information technology ("IT") environment using a tag-based approach. The disclosed tag-based classification techniques can be implemented through a graphical user interface. Embodiments of the disclosed tag-based classification techniques can be used to allow a user to easily and quickly select and perform actions on groups of one or more assets (e.g., monitor policies, perform upgrades, etc.). For example, the tag-based classification techniques can automatically classify assets into "tag sets" (or "tagged sets") based on node properties or user-selected criteria or conditions (e.g., criteria or conditions that are established in a user-created tagging profile or rule). The tagged assets can then be further filtered to identify even deeper relationships between the assets.

16 Claims, 26 Drawing Sheets
(19 of 26 Drawing Sheet(s) Filed in Color)

Related U.S. Application Data continuation of application No. 13/597,242, filed on Aug. 28, 2012, now Pat. No. 9,922,055.

(60) Provisional application No. 61/646,126, filed on May 11, 2012, provisional application No. 61/528,679, filed on Aug. 29, 2011.

(51) Int. Cl.
 *G06F 16/22* (2019.01)
 *H04L 41/085* (2022.01)

(58) Field of Classification Search
 USPC .......................................................... 707/634
 See application file for complete search history.

(56) References Cited

U.S. PATENT DOCUMENTS

| | | | |
|---|---|---|---|
| 7,360,099 B2 | 4/2008 | Difalco et al. | |
| 7,587,754 B2 | 9/2009 | Difalco et al. | |
| 7,620,715 B2 | 11/2009 | Difalco et al. | |
| 7,765,460 B2 | 7/2010 | Difalco et al. | |
| 7,822,724 B2 | 10/2010 | Difalco et al. | |
| 8,140,635 B2 | 3/2012 | Difalco | |
| 8,176,158 B2 | 5/2012 | Difalco et al. | |
| 8,566,823 B2 | 10/2013 | Wagner et al. | |
| 8,600,996 B2 | 12/2013 | Good et al. | |
| 8,819,491 B2 | 8/2014 | Whitlock et al. | |
| 8,862,941 B2 | 10/2014 | Whitlock et al. | |
| 8,868,987 B2 | 10/2014 | Wagner | |
| 8,875,129 B2 | 10/2014 | Wagner et al. | |
| 8,914,341 B2 | 12/2014 | Difalco | |
| 8,996,684 B2 | 3/2015 | Good et al. | |
| 9,026,646 B2 | 5/2015 | Whitlock et al. | |
| 9,209,996 B2 | 12/2015 | Difalco | |
| 9,256,841 B2 | 2/2016 | Difalco et al. | |
| 9,922,055 B2 | 3/2018 | Whitlock et al. | |
| 2003/0233287 A1 | 12/2003 | Sadler et al. | |
| 2004/0024660 A1 | 2/2004 | Ganesh et al. | |
| 2006/0129415 A1* | 6/2006 | Thukral | G06Q 10/087 705/28 |
| 2006/0187026 A1 | 8/2006 | Kochis | |
| 2006/0242277 A1 | 10/2006 | Torrence et al. | |
| 2007/0043786 A1 | 2/2007 | Difalco et al. | |
| 2007/0113293 A1* | 5/2007 | Blumenau | G06Q 10/06 707/E17.01 |
| 2007/0124255 A1 | 5/2007 | Difalco et al. | |
| 2007/0133293 A1 | 6/2007 | Chih | |
| 2007/0273519 A1 | 11/2007 | Ichikawa et al. | |
| 2009/0182610 A1 | 7/2009 | Palanisamy et al. | |
| 2011/0138038 A1 | 6/2011 | Good et al. | |
| 2012/0023076 A1 | 1/2012 | Torrence et al. | |
| 2012/0096065 A1* | 4/2012 | Suit | H04L 41/0816 709/202 |
| 2012/0291056 A1 | 11/2012 | Donoghue | |
| 2013/0054601 A1 | 2/2013 | Whitlock et al. | |
| 2013/0073704 A1 | 3/2013 | Whitlock et al. | |
| 2014/0053145 A1 | 2/2014 | Steigleder | |
| 2014/0082620 A1 | 3/2014 | Wagner et al. | |
| 2014/0096181 A1 | 4/2014 | Rivers | |
| 2015/0263926 A1* | 9/2015 | Narayanan | H04L 43/0817 715/736 |
| 2017/0208088 A1* | 7/2017 | Molloy | G06F 16/24573 |

OTHER PUBLICATIONS

Kim et al., "Experiences with Tripwire: Using Integrity checkers for Intrusion Detection," Computer Science Technical Reports, Report No. 94-012, 15 pp. (Mar. 1994).

\* cited by examiner

MANAGING AND CLASSIFYING ASSETS IN AN INFORMATION TECHNOLOGY ENVIRONMENT USING TAGS

CROSS REFERENCE TO RELATED APPLICATIONS

This application is a divisional of U.S. patent application Ser. No. 15/925,436, filed Mar. 19, 2018, entitled "MANAGING AND CLASSIFYING ASSETS IN AN INFORMATION TECHNOLOGY ENVIRONMENT USING TAGS," which is a continuation of U.S. patent application Ser. No. 13/597,242 filed Aug. 28, 2012, entitled "MANAGING AND CLASSIFYING ASSETS IN AN INFORMATION TECHNOLOGY ENVIRONMENT USING TAGS," which claims the benefit of U.S. Provisional Application No. 61/528,679 filed on Aug. 29, 2011, entitled "MANAGING AND CLASSIFYING ASSETS IN AN INFORMATION TECHNOLOGY ENVIRONMENT USING TAGS" and the benefit of U.S. Provisional Application No. 61/646,126 filed on May 11, 2012, entitled "MANAGING AND CLASSIFYING ASSETS IN AN INFORMATION TECHNOLOGY ENVIRONMENT USING TAGS," all of which applications are incorporated herein by reference in their entirety.

FIELD

This application relates generally to the field of information technology ("IT") compliance and configuration control, asset control, and asset management.

SUMMARY

Disclosed below are representative embodiments of methods, apparatus, and systems for managing and classifying assets in an information technology ("IT") environment using a tag-based approach. The disclosed methods, apparatus, and systems should not be construed as limiting in any way. Instead, the present disclosure is directed toward all novel and/or nonobvious features and aspects of the various disclosed embodiments, alone or in various combinations and subcombinations with one another.

In some exemplary embodiments, tagging profiles are created and applied using a computer-implemented method. For example, in one implementation, a set of conditions to establish a tagging profile is received. Identifications of one or more tags associated with the tagging profile are received. The tagging profile is applied to nodes in an information technology network by determining one or more nodes in the information technology network that satisfy one or more conditions of the set of conditions. The one or more tags are associated with the nodes that satisfy the one or more conditions. A list of the one or more tags can then be displayed. Further, after user selection of a respective one of the tags, a list of the nodes associated with the respective one of the tags can be displayed. The method can be implemented by one or more non-transitory computer-readable media storing computer-executable instructions which when executed by a computer cause the computer to perform the method.

In certain exemplary embodiments disclosed herein, one or more tags are automatically assigned to a new node in a computer network through a computer-implemented method. For example, in one implementation, nodes in a computer network are monitored. The nodes in this implementation comprise one or more of a database server, directory server, file server, or network device. A new node is detected in the computer network, and, upon detecting the new node and without user initiation, the new node is associated with one or more tags. The method can be implemented by one or more non-transitory computer-readable media storing computer-executable instructions which when executed by a computer cause the computer to perform the method.

In some exemplary embodiments disclosed herein, tagging information is displayed to the user in a multi-pane computer interface that also allows for user-selectable filters to be applied. For instance, in one implementation, a list of tags is displayed in a first portion of a screen. Each tag of this implementation is associated with a property of an asset in an information technology environment. A filter request specifying a keyword or tag is received. The keyword or tag is matched to multiple assets in the information technology environment. A list of assets matching the keyword or tag is displayed in a second portion of the screen distinct from the first portion. The method can be implemented by one or more non-transitory computer-readable media storing computer-executable instructions which when executed by a computer cause the computer to perform the method.

In certain exemplary embodiments disclosed herein, data sets for a hierarchically arranged database or file system are generated using a tag-based paradigm. For example, in one implementation, a set of conditions to establish a tagging profile is received. In this implementation, the set of conditions specifies a set of one or more conditions that must be satisfied by a node before the node is assigned a tag associated with the tagging profile. Identifications of one or more tags associated with the tagging profile are received. The tagging profile is applied to nodes in an information technology network. In this implementation, the act of applying the tagging profile comprises assigning the tag associated with the tagging profile to one or more nodes of the nodes in the information technology network that satisfy the set of conditions specified in the tagging profile, thereby generating a tagged set of nodes. A data set in a hierarchically arranged database or file system that comprises the tagged set of nodes is then generated. The method can be implemented by one or more non-transitory computer-readable media storing computer-executable instructions which when executed by a computer cause the computer to perform the method.

The foregoing and other objects, features, and advantages of the disclosed technology will become more apparent from the following detailed description, which proceeds with reference to the accompanying figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

I. General Considerations

Figure 1:
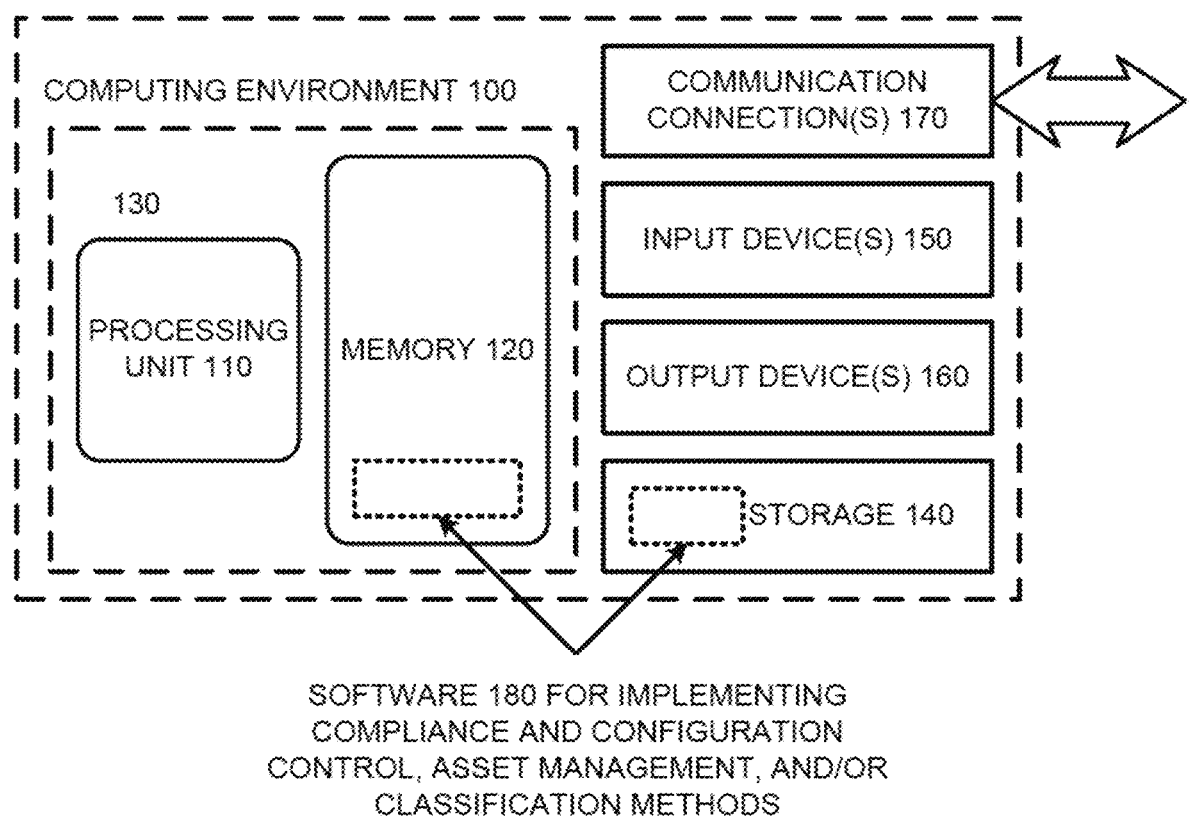
FIG. 1 is a block diagram illustrating a computing environment in which aspects of the disclosed technology can be performed.

Disclosed below are representative embodiments of methods, apparatus, and systems for managing and classifying assets in an information technology ("IT") environment using a tag-based approach. The disclosed methods, apparatus, and systems should not be construed as limiting in any way. Instead, the present disclosure is directed toward all novel and nonobvious features and aspects of the various disclosed embodiments, alone and in various combinations and subcombinations with one another. Furthermore, any features or aspects of the disclosed embodiments can be used in various combinations and subcombinations with one another. For example, one or more method acts from one embodiment can be used with one or more method acts from another embodiment and vice versa. The disclosed methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "determine," "harvest," and "select," to describe the disclosed methods. These terms are high-level abstractions of the actual operations that are performed. The actual operations that correspond to these terms may vary depending on the particular implementation and are readily discernible by one of ordinary skill in the art. Additionally, as used herein, the term "and/or" means any one item or combination of items in the phrase.

II. Example Computing Environments for Implementing Embodiments of the Disclosed Technology Any of the disclosed methods can be implemented as computer-executable instructions stored on one or more computer-readable media (e.g., non-transitory computer-readable media, such as one or more optical media discs, volatile memory components (such as DRAM or SRAM), or nonvolatile memory components (such as hard drives)) and executed on a computer (e.g., any commercially available computer, including desktop computers, servers, smart phones, tablet computers, netbooks, or other devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods can also be implemented by specialized computing hardware that is configured to perform any of the disclosed methods. For example, the disclosed methods can be implemented (entirely or at least in part) by an integrated circuit (e.g., an application specific integrated circuit ("ASIC") or programmable logic device ("PLD"), such as a field programmable gate array ("FPGA")). The integrated circuit can be embedded in or directly coupled to an electrical device having a suitable display device.

FIG. 1 illustrates a generalized example of a suitable computing environment 100 in which several of the described embodiments can be implemented. The computing environment 100 is not intended to suggest any limitation as to the scope of use or functionality of the disclosed technology, as the techniques and tools described herein can be implemented in diverse general-purpose or special-purpose environments that have computing hardware.

With reference to FIG. 1, the computing environment 100 includes at least one processing unit 110 and memory 120. In FIG. 1, this most basic configuration 130 is included within a dashed line. The processing unit 110 executes computer-executable instructions. In a multi-processing system, multiple processing units execute computer-executable instructions to increase processing power. The memory 120 may be volatile memory (e.g., registers, cache, RAM), non-volatile memory (e.g., ROM, EEPROM, flash memory), or some combination of the two. The memory 120 stores software 180 implementing one or more of the described tag-based asset management and classification embodiments and/or compliance and configuration control embodiments for operating or using the disclosed technology. For example, the memory 120 can store software 180 for implementing any of the disclosed techniques described herein and their accompanying user interfaces.

The computing environment can have additional features. For example, the computing environment 100 includes storage 140, one or more input devices 150, one or more output devices 160, and one or more communication connections 170. An interconnection mechanism (not shown) such as a bus, controller, or network interconnects the components of the computing environment 100. Typically, operating system software (not shown) provides an operating environment for other software executing in the computing environment 100, and coordinates activities of the components of the computing environment 100.

The storage 140 can be removable or non-removable, and includes magnetic disks, magnetic tapes or cassettes, CD-ROMs, DVDs, or any other tangible non-transitory non-volatile memory or storage medium which can be used to store information and which can be accessed within the computing environment 100. The storage 140 can also store instructions for the software 180 implementing any of the described techniques, systems, or environments.

The input device(s) 150 can be a touch input device such as a keyboard, touchscreen, mouse, pen, trackball, a voice input device, a scanning device, or another device that provides input to the computing environment 100. The output device(s) 160 can be a display device (e.g., a computer monitor, smartphone display, tablet display, netbook display, or touchscreen), printer, speaker, CD-writer, or another device that provides output from the computing environment 100.

The communication connection(s) 170 enable communication over a communication medium to another computing entity. The communication medium conveys information such as computer-executable instructions or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

As noted, the various methods can be described in the general context of computer-readable instructions stored on one or more computer-readable media. Computer-readable media are any available media that can be accessed within or by a computing environment. By way of example, and not limitation, with the computing environment 100, computer-readable media include tangible non-transitory computer-readable media such as memory 120 and storage 140.

The various methods disclosed herein can also be described in the general context of computer-executable instructions, such as those included in program modules, being executed in a computing environment by a processor. Generally, program modules include routines, programs, libraries, objects, classes, components, data structures, and so on that perform particular tasks or implement particular abstract data types. The functionality of the program modules may be combined or split between program modules as desired in various embodiments. Computer-executable instructions for program modules may be executed within a local or distributed computing environment.

Figure 2:
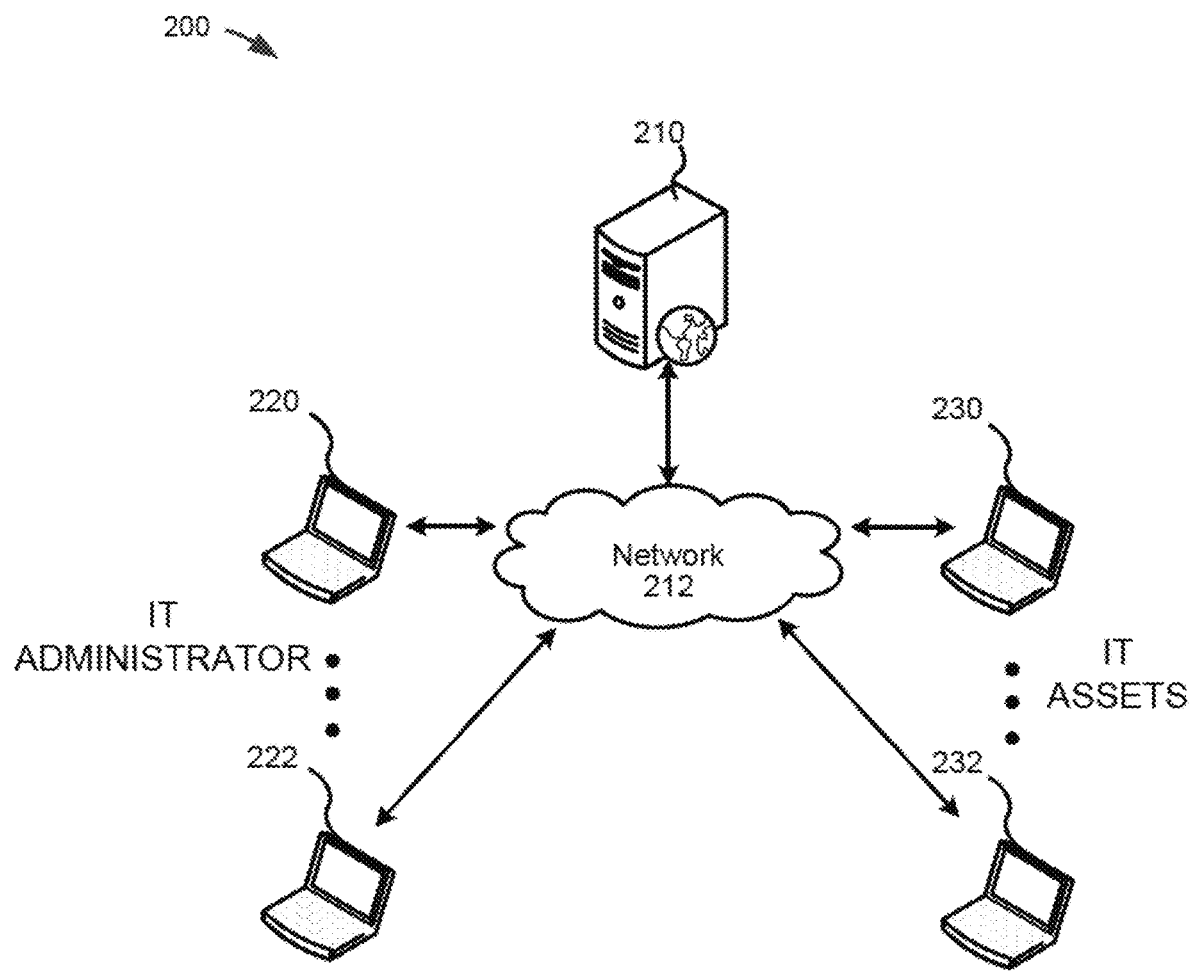
FIG. 2 is a block diagram showing a first exemplary network environment in which aspects of the disclosed technology can be performed.

An example of a possible network topology (e.g., a client-server network or cloud-based network) for implementing a system according to the disclosed technology is depicted in FIG. 2. Networked computing devices 220, 222, 230, 232 can be, for example, computers running a browser, plug-in, or other software that communicates with one or more central computers 210 (e.g., one or more servers in a cloud computing environment) via network 212. The computing devices 220, 222, 230, 232 and the central computer 210 can have computer architectures as shown in FIG. 1 and discussed above. The computing devices 220, 222, 230, 232 are not limited to traditional personal computers but can comprise other computing hardware configured to connect to and communicate with a network 212 (e.g., smart phones or other mobile computing devices, servers, network devices, dedicated devices, and the like).

In the illustrated embodiment, the computing devices 220, 222, 230, 232 are configured to communicate with one or more central computers 210 via a network 212 (e.g., using a cloud network or other client-server network). In certain implementations, the central computers 210 execute software for performing any of the disclosed compliance and configuration control functionalities, for implementing any of the disclosed graphical user interfaces, and/or for computing any one or more of the intermediate or final values associated with the disclosed embodiments. The central computers 210 can transmit data to any of the computing devices 220, 222 (e.g., data to be displayed on a graphical user interface or web page at the computing devices 220, 222). For example, the computing devices 220, 222 (e.g., computing devices associated with an IT administer) can transmit a request for data to the central computer 210 over the network 212. In order to provide the data, the one or more central computers 210 can access data from the computing devices 230, 232 (e.g., computing devices or other devices associated with assets in the IT infrastructure administered by the IT administrator), which can store various types of data used by the IT administrator. For example, the computing devices 230, 232 may store device configuration data, compliance policy data, and/or other such data used by an IT compliance and configuration control tool. Alternatively, the one or more central computers 210 may themselves store the device configuration data, compliance policy, and other such IT data.

Figure 3:
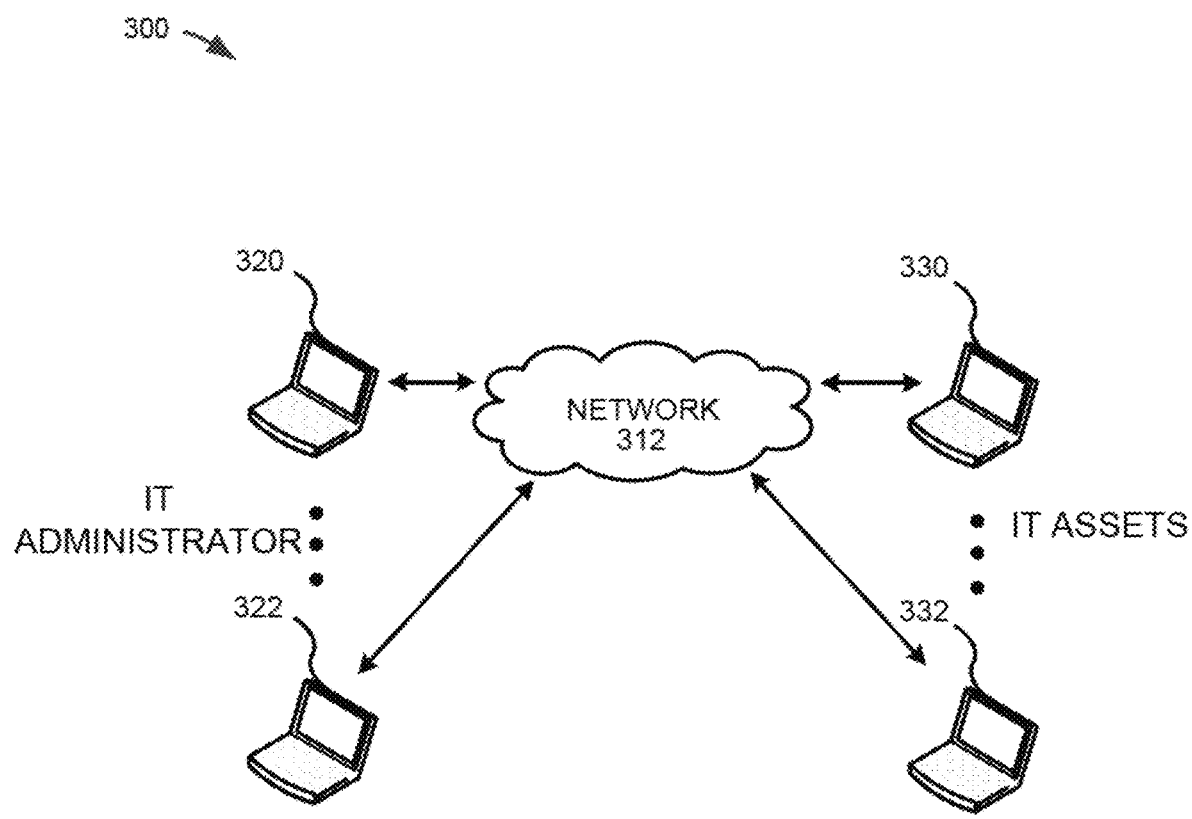
FIG. 3 is a block diagram showing a second exemplary network environment in which aspects of the disclosed technology can be performed.

Another example of a possible network topology for implementing a system according to the disclosed technology is depicted in FIG. 3. Networked computing devices 320, 322, 330, 332 can be, for example, computers running a browser or other software connected to a network 312. As above, the computing devices 320, 322, 330, 332 can have computer architectures as shown in FIG. 1 and discussed above. The computing devices 320, 322, 330, 332 are not limited to traditional personal computers but can comprise other computing hardware configured to connect to and communicate with a network 312 (e.g., smart phones or other mobile computing devices, servers, network devices, dedicated devices, and the like).

In the illustrated embodiment, the computing devices 320, 322 are configured to communicate directly with computing devices 330, 332 via the network 312. In the illustrated embodiment, the computing devices 320, 322 are configured to locally implement any of the disclosed compliance and configuration control functionalities, implement any of the disclosed graphical user interfaces, and/or compute any one or more of the intermediate or final values associated with the disclosed embodiments. The computing devices 320, 322 can use data obtained from the computing devices 330, 332 via the network 312. Any of the data received from the devices 330, 332, can be stored or displayed on any of the computing devices 320, 322 (e.g., displayed as data on a graphical user interface or web page at the computing devices 320, 322).

In the illustrated embodiments, the illustrated networks 212, 312 can be implemented as a Local Area Network ("LAN") using wired networking (e.g., the Ethernet IEEE standard 802.3 or other appropriate standard) or wireless networking (e.g. one of the IEEE standards 802.11a, 802.11b, 802.11g, or 802.11n or other appropriate standard). Alternatively, at least part of the networks 212, 312 can be the Internet or a similar public network and operate using an appropriate protocol (e.g., the HTTP protocol).

III. Introduction to the Disclosed Technology

Described herein are methods, systems, and apparatus that can be used to manage and classify assets in an information technology ("IT") environment. In particular embodiments, the disclosed technology can be used as part of (or in connection with) an IT compliance and configuration control software tool that provides compliance and configuration control of one or more IT assets. In this disclosure, assets are also referred to as "nodes". The IT assets (or nodes) can comprise, for example, servers, desktops, directory servers, hypervisors, databases, middleware applications, network devices, virtual infrastuctures, and/or other such assets. The compliance and configuration control tool can be used to detect, analyze, and report on change activity in an IT infrastructure. For example, the compliance and configuration control tool can assess configurations of the one or more assets at one or more locations and determine whether the assets comply with internal and external policies. The compliance and configuration control tool can identify and validate changes to ensure these configurations remain in known and trusted states.

In particular implementations, the compliance and configuration control tool operates by capturing a baseline of server file systems, desktop file system, directory servers, databases, virtual systems, middleware applications and/or network device configurations in a known good state. Ongoing integrity checks then compare the current states against these baselines to detect changes. The compliance and configuration control tool collects information used to reconcile detected changes, ensuring they are authorized and intended changes. The compliance and configuration control tool can crosscheck detected changes with defined IT compliance policies (e.g., using policy-based filtering), with documented change tickets in a change control management (CCM) system or a list of approved changes, with automatically generated lists created by patch management and software provisioning tools, and/or against other desired and approved changes. This allows the compliance and configuration control tool to automatically recognize desired changes and expose undesired changes. The compliance and configuration control tool can also generate one or more reports concerning the monitored assets showing a wide variety of information (e.g., compliance information, configuration information, usage information, etc.)

One such compliance and configuration control tool that is suitable for use with the disclosed technology is the Tripwire® Enterprise tool available from Tripwire, Inc. The examples described below are shown as being used in connection with the Tripwire Enterprise tool. This particular usage should not be construed as limiting, however, as the disclosed technology can be used to manage and classify assets in other compliance and configuration control tools as well.

IV. Example Embodiments of Tag-Based Asset Management and Classification

The disclosed embodiments concern methods, systems, and apparatus for classifying assets monitored by a compliance and configuration control tool. The disclosed classification techniques can be implemented through a graphical user interface, such as any one or more of the user interfaces shown in the screen shots and described below. Embodiments of the disclosed tag-based classification techniques can be used to allow a user to easily and quickly select and perform actions on groups of one or more assets (e.g., monitor policies, perform upgrades, etc.). For example, the tag-based classification techniques can automatically classify tags into "tag sets" (or "tagged sets") based on node properties or user-selected criteria or conditions (e.g., criteria or conditions that are established in a user-created tagging profile or rule). The tagged assets can then be further filtered to identify even deeper relationships between the assets. When applying filters to the tagged data, one or more filter criteria can be applied and joined using any suitable boolean operator (e.g., OR, AND, etc.). Furthermore, relationships between tag sets can be identified through filtering (also by using one or more filter criteria joined using any suitable boolean operator).

In certain embodiments, the disclosed tag-based classification techniques work in conjunction with an underlying compliance and configuration control tool that arranges and represents assets according to a hierarchical tree model. In the exemplary embodiments described in the appendices, for example, the tag-based classification methods are implemented through a software component termed "asset view" or "asset manager", which can be used to classify the assets that are maintained by the Tripwire® Enterprise tool (which represents assets and their associated properties according to a hierarchical tree model). In these embodiments, the tag-based classification tool operates by using information about the assets that is available from (or harvested from) the assets monitored by the underlying compliance and configuration control tool. This information can include, for instance, information about the asset's operating system, database version, IP address, and/or other such configuration information. In some cases, this information is available from the underlying hierarchical file system or from a configuration management database maintained by the compliance and configuration control tool, but can also be obtained by harvesting the information directly from the assets through suitable network commands (which can be sent from the tag-based classification tool itself or from the underlying compliance and configuration control tool). Communications between the tag-based classification tool and the underlying compliance and configuration control tool can be performed using a suitable message bus (e.g., a message bus operating according to the AMQP protocol or other suitable messaging protocol). Through the use of such a message bus, the tag-based classification tool can have access to and use the functionalities of the underlying compliance and configuration tool.

By using tags, the time-consuming, non-intuitive, and burdensome task of manually navigating the hierarchical tree model and grouping assets having particular properties can be avoided. Furthermore, hierarchical tree models arrange nodes according to static relationships. By contrast, embodiments of the disclosed tag-based classification techniques allow for classifications to be dynamically created.

Example Embodiments of Asset View Interfaces and Methods

Figure 4:
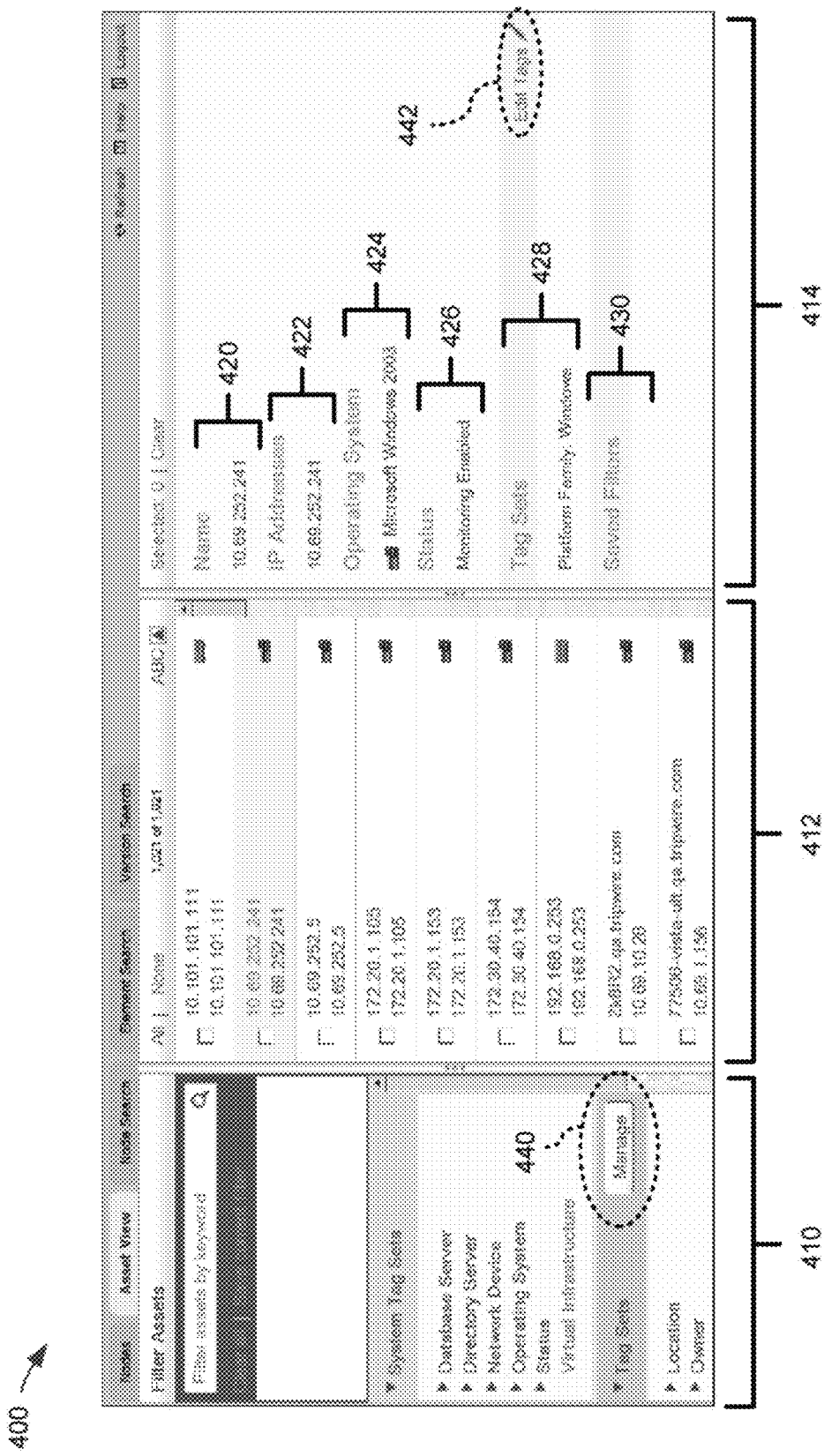
FIGS. 4-20 are screenshots from example implementations of the disclosed technology and illustrating aspects of the tag-based asset managing and classifying techniques that can be realized in embodiments of the of the disclosed technology.

FIG. 4 is a screenshot of an exemplary user interface 400 for implementing a tag-based asset monitoring and management scheme according to an embodiment of the disclosed technology. By using a "tagging" paradigm such as shown in FIG. 4, greater customization and control for monitoring and managing assets with a compliance and configuration control tool is possible. For example, nodes (assets) in an IT environment have certain characteristics or classifications that can be "tagged" to the node using a tag-based paradigm. In the exemplary embodiments discussed below in FIGS. 4-20, the tag-based monitoring and management tool is termed "asset view", though it should be understood that this name is by way of example only.

Figure 5:
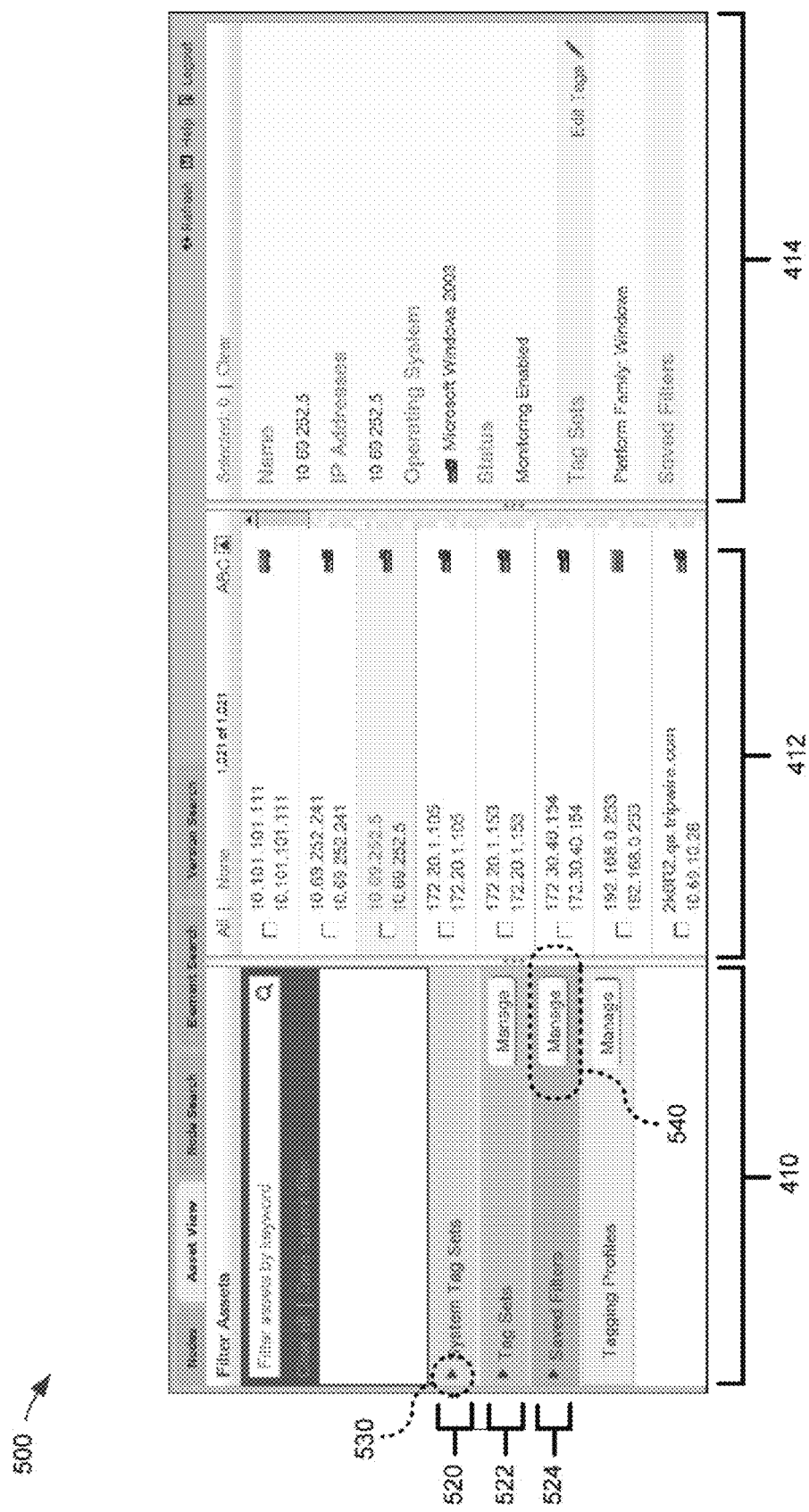

In the example user interface shown in FIG. 4, the asset view interface 400 is divided into three panes: a left pane 410, termed the asset filter pane; a middle pane 412, termed the asset list pane; and a right pane 414, termed the selection information pane. In particular, the asset filter pane 410 shows one or more asset filtering mechanisms or categories. The asset list pane 412 shows a list of the various assets associated with a filter or tag set selected from the asset filter pane 410. For instance, in the illustrated embodiment, the assets are shown by name and IP address (where the name, in some cases, is the same as the IP address). In some embodiments, the asset list pane 412 can include additional information about the listed assets. For example, an icon or other indication may appear in the asset list pane 412 showing the "health" of the asset (e.g., a red-colored icon may indicate that there is a potential malfunction or security threat associated with the asset). The selection information pane 414 shows details about a particular asset. For example, in the illustrated screenshot, the selection information pane 414 shows detail of a particular node (asset). For instance, in the illustrated implementation, the selection information pane shows the name of the node (at 420), the IP address associated with the node (at 422), the operating system running on the node (at 424), the status of the node (at 426) (e.g., whether monitoring of the node is enabled or not), the tag sets that are associated with the nodes (at 428), and any saved filters that include the node (at 430). In other implementations, any one or more of these items of information can be included alone or in various subcombinations in the selection information pane, potentially along with other information. For example, in some implementations, information about the health of the asset is included in the selection information pane 414 (e.g., an indication or identification of a malfunction or potential threat associated with the asset). Further, the particular number and arrangement of panes shown in FIG. 4 should not be construed as limiting in any way, as any number or arrangement of panes is possible. In the asset filter pane 410 and elsewhere in the asset view interface, groups of items can be collapsed or expanded by toggling an arrow associated with the item. For example, FIG. 5 shows a screenshot 500 of the asset filter pane 410 with expandable or collapsible groups of items for system tag sets 520, tag sets 522, and saved filters 524 (e.g., expandable or collapsible by clicking any of the associated arrows, such as arrow 530, which in a collapsed (as seen by comparing FIG. 4 with FIG. 5)).

Example Embodiments of Asset Filtering Interfaces and Methods

Figure 6:
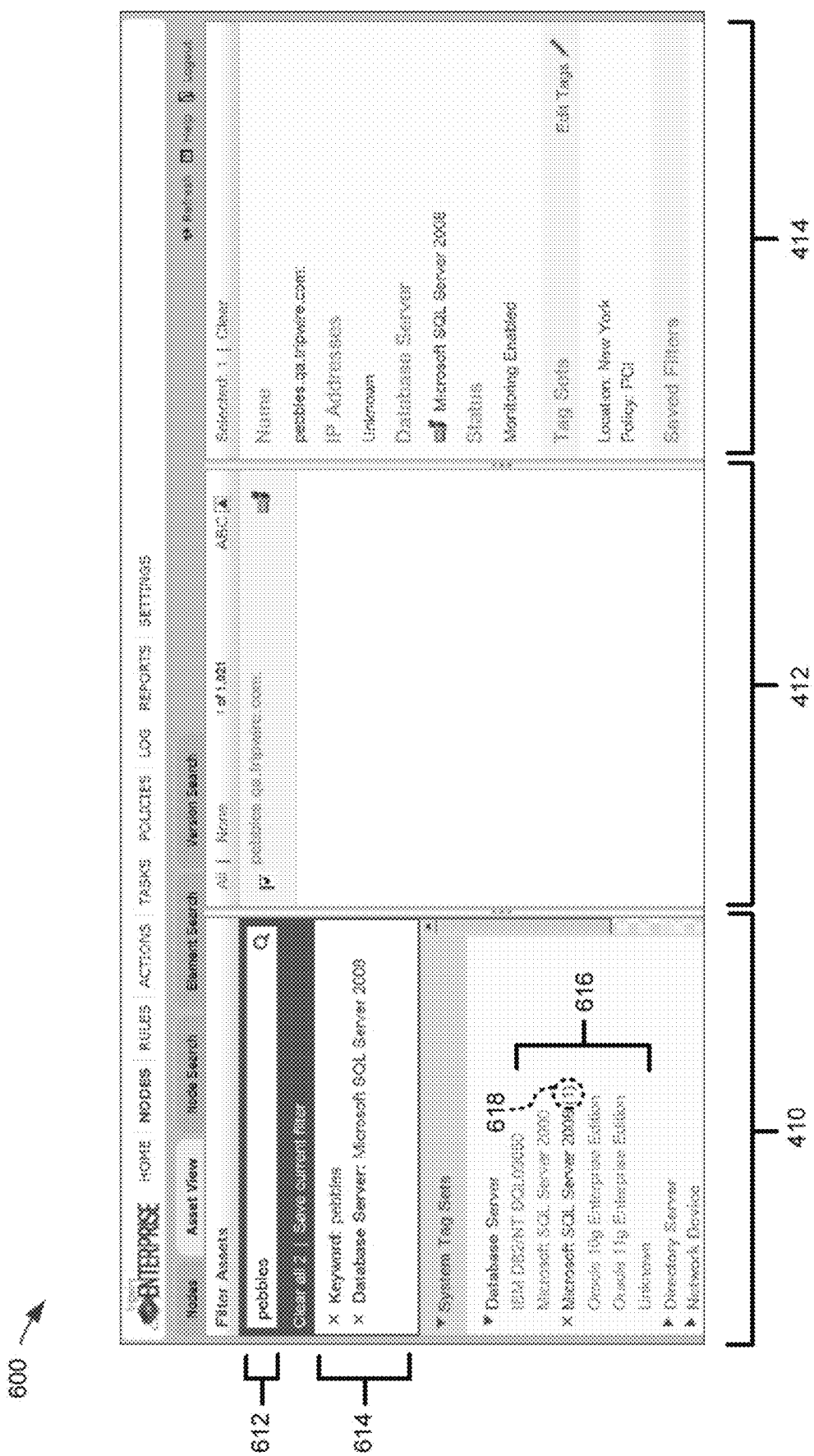

Filtering assets by tags and/or keywords allows a user to quickly obtain information about nodes; and by applying particular tags to a node, the node can easily be scoped to a specific monitoring/compliance process in a compliance and configuration control tool. For example, FIG. 6 is a screenshot 600 of a user using a keyword search together with a selection from the system tag sets group of tags to identify one or more nodes meeting the identified criteria. In particular, a user is able to select one or more criteria in a filter request selection area 614 of the asset filter pane 410 to filter nodes to identified criteria. A user can select one or more tags (from the system tag set or other tag set group) or one or more saved filters to search within (e.g., by including the tag set or filter as one of the criteria in the filter request selection area 614). For example, in the screenshot 600, the user has selected to search within a particular database server tag that is part of the database server tag set. In particular, the user has selected to search within the group of nodes having a database server tag of "Microsoft SQL Server 2008", as shown by the "Microsoft SQL Server 2008" designation in the expanded set of tag sets for database servers being selected by a user and included in the filter request selection area 614. The term "Microsoft SQL Server 2008" can also be highlighted or have a different color in expandable list 616 showing the tags for the "database server" tag set. Furthermore, the asset filter pane 410 includes a keyword filter area 612 in which a user can enter one or more keywords. For example, in the example shown in FIG. 6, the user has entered the search term "pebbles" in the keyword filter area 612. Thus, the asset list pane 412 and the selection information pane 414 show results from a search for nodes among database servers running "Microsoft SQL Server 2008" that include the word "pebbles". In the particular search shown, the search is a Boolean AND search: search for any nodes having the word "pebbles" AND having the data server tag titled "Microsoft SQL Server 2008". If multiple database server tags were selected, the search would be modified to search among all tags using an OR operation as appropriate. For example, if the user selected both the "Microsoft SQL Server 2008" and "Oracle 10g Enterprise Edition" tags, then the search would be: search for any nodes having the word "pebbles" AND having the data server tag titled ("Microsoft SQL Server 2008" OR "Oracle 10g Enterprise Edition"). The criteria of the asset filter can be easily modified by either selecting further tags or tag sets in which to perform a search, by adding additional keywords, tags, or tag sets, or by deleting keywords, tags, or tag sets by selecting a "de-select" symbol or icon (e.g., by selecting the "x"s that are associated with each keyword, tag, or tag set).

Also shown in FIG. 6 are the asset list pane 412 and the selection information pane 414 showing the results of the search performed according to the criteria designated in the filter request selection area 614. For example, in the illustrated screenshot 600, the asset list pane 412 shows a single result for the search criteria as well as the specifics of the identified node in the selection information pane 414. Further, in some embodiments, one or more counters are displayed in the asset filter pane 410 that indicate the number of matching nodes associated with the displayed tags, thus providing a dynamically updated indication of how many nodes match the requested filter criteria. For example, in FIG. 6, counter 618 indicates that "1" node tagged with the Microsoft SQL Server 2008 tag matches the filter request.

Figure 21:
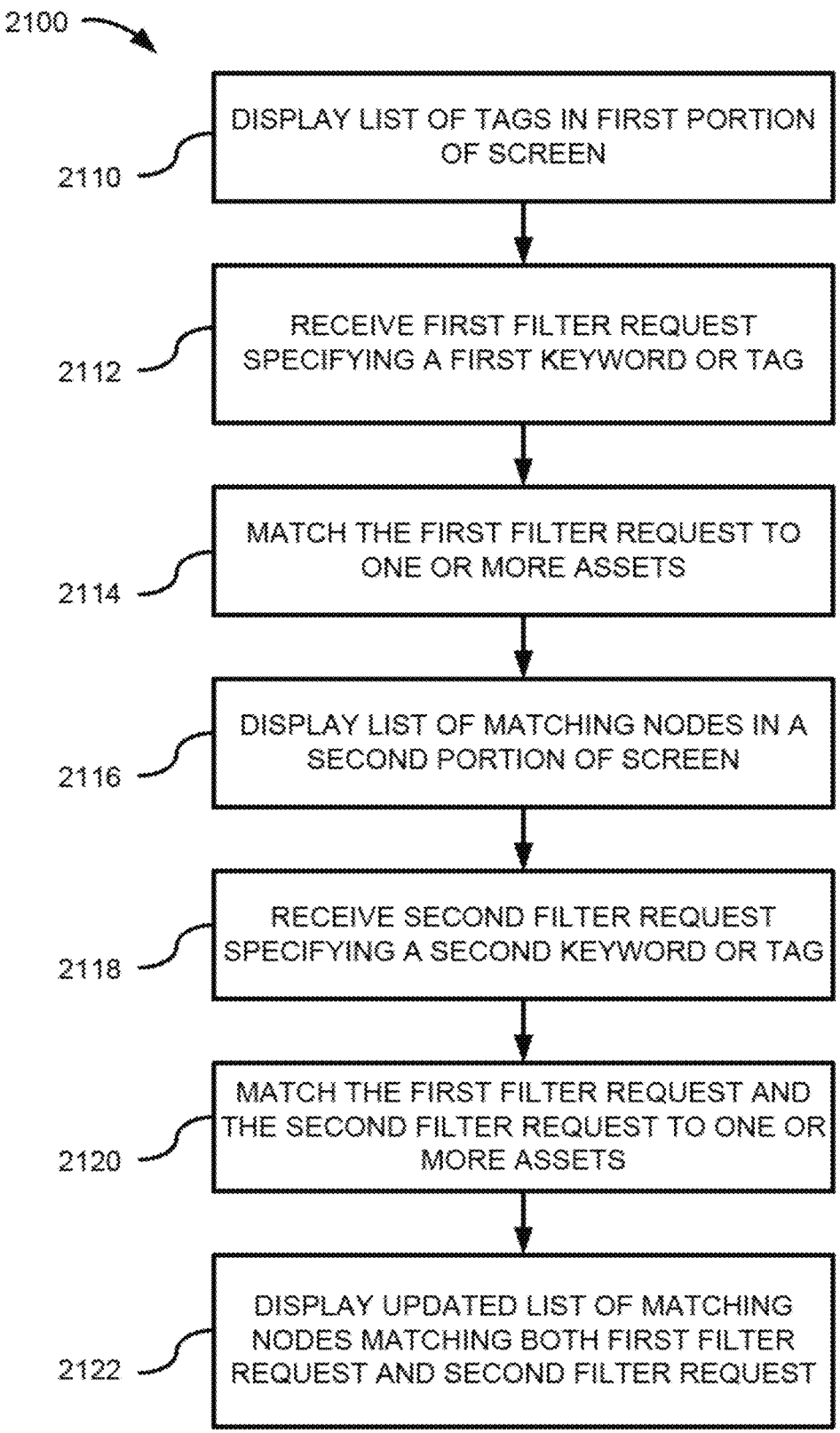
FIG. 21 is a flow chart illustrating one exemplary method for performing asset filtering according to an embodiment of the disclosed technology.

FIG. 21 is a flow chart 2100 illustrating one exemplary method for performing asset filtering according to an embodiment of the disclosed technology. The method acts shown in FIG. 21 should not be construed as limiting, as any one or more of the method acts may be omitted, performed in a different order, or supplemented with one or more additional method acts.

At 2110, a list of tags is displayed in a first portion of a screen (e.g., as shown in asset filter pane 410 of FIG. 6). Furthermore, in the displayed list, each tag is associated with a property of an asset in an information technology environment (e.g., in FIG. 6, each asset in expandable list 616 is associated with a particular type of database server software).

At 2112, a filter request specifying a first keyword or tag is received (e.g., input or otherwise buffered for further processing). For example, in FIG. 6, the user can make a filter request through the keyword filter area 612 or by selecting a particular tag in the asset filter pane 410.

At 2114, the first filter request (e.g., the first specified keyword or tag) is matched to one or more assets in the information technology environment. For example, one or more databases and/or hierarchically arranged file systems that are maintained and that include asset information for the assets in the IT environment can be searched for matching entries. In particular embodiments, the searching can be performed using an exact matching search, a regular expression search, or some other recognized searching method. For example, by using a regular expression search a user can identify matching assets based only on partial information about the node (e.g., a portion of the IP address, node name, operating system, or other node property). Furthermore, in certain embodiments, the search is performed across multiple fields in the asset database and/or files storing information about the assets (e.g., across all fields and/or files) and not just a particular type of field or file. In other embodiments, the search is limited to a subset or just one field of a database or file of a file system. For example, in certain embodiments, the search is performed only on fields storing information for the attributes that are displayed in the selection information pane (e.g., pane 414) and/or on another subset of fields, such as fields storing data for one or more of a host name, IP address, or tag. Additionally, any of these various searching options can be user-selectable or preset.

At 2116, a list of nodes matching the keyword or tag is displayed in a second portion of the screen distinct from the first portion. For example, in FIG. 6, the results of the matching can be displayed in the asset list pane 412.

At 2118, a second filter request specifying a second keyword or tag is received. For example, in FIG. 6, the user has made a first filter request by selecting the "Microsoft SQL Server 2008" tag and a second filter request by entering the keyword "pebbles" in the keyword filter area 612. Both requests are displayed in the asset list pane and can be de-selected upon a user selecting the "x" icon adjacent the respective request. In certain embodiments, only a single keyword search can be performed, but additional search criteria can be added by selecting additional tag(s). At 2120, the second filter request (e.g., the second keyword or tag) is matched to one or more assets that also match the first filter request (e.g., using any of the search methods described above).

At 2122, an updated list of nodes matching both the first keyword (or tag) and the second keyword (or tag) is displayed in the second portion of the screen. For example, in FIG. 6, the results of the matching according to both filter requests are displayed. In this way, the results of the filtering process are dynamically updated for the user, allowing the user quickly and easily see how variations in the filter request affect the search results and more quickly locate the desired results.

In certain embodiments, upon user selection of a respective one of the nodes in the second panel of the display screen, additional information about the respective one of the nodes is displayed in a third panel of the display screen (e.g., the selection information pane 414 shown in FIG. 6). Further, as illustrated in FIG. 6, the third panel of the display screen can also include a portion that shows the tags that are associated with the selected asset. Additionally, the list of tags displayed in the first portion of the screen can be dynamically updated to further include a numerical indicator adjacent to each tag having matching assets. For example, as illustrated in FIG. 6, a numerical indicator "(1)" appears adjacent to the tag "Microsoft SQL Server 2008" to indicate that one node associated with the tag matches the two filter requests shown in a filter request selection area 614 of the asset filter pane 410. In certain embodiments, the list of tags displayed in the first panel of the screen is displayed as part of a tag set in an expandable list of tag sets in which, upon expansion, each tag set displays the respective tags for the tag set. One example of such an expandable list is shown as expandable list 616 in FIG. 6, where the tag set "Database Server" is expanded to show the included tags.

Examples of System Tag Set Interfaces and Methods

In some embodiments of the disclosed technology, certain tag sets are automatically generated. For example, the compliance and configuration control tool can be configured to automatically obtain certain data for each node (e.g., as each node is added to an IT infrastructure). The process of automatically obtaining certain types of data for a node is referred to herein as "harvesting". For example, in certain embodiments, when a node is added to an IT infrastructure, one or more items of data concerning the configuration of the node are automatically stored (harvested). In particular implementations, the automatically obtained data can include an identification of the type of device the node is, an identification of the version of the operating system running on the node, an identification of the database server software running on the node, and/or an identification of the directory server software running on the node. This data can then be used by the tag-based monitoring and management tool (e.g., asset view) to automatically assemble system tag sets without user intervention. In other words, this information can be used create preset, automatic system tag sets.

Figure 7:

Furthermore, in certain embodiments, this same information can be used to create groups of assets that are available to the user in the traditional hierarchically arranged group format (e.g., a hierarchical file format) usable with a non-tagged-based tool (e.g., Tripwire Enterprise). For example, FIG. 7 shows a screenshot of a tag-based user interface 700 (e.g., asset view) and a screenshot of a hierarchical-tree-arranged user interface 702 (e.g., Tripwire Enterprise). As can be seen, the system tags (shown at 710) from the tag-based user interface (specifically, the tag sets "Microsoft Active Directory", "Sun Directory Server", and "Sun Microsystems Inc., Sun Java™ System Directory Server") are also shown in the hierarchical-tree-arranged user interface (shown at 712). These automatically created groups of nodes in the hierarchical-tree-arranged user interface 702 are sometimes referred to as "smart node groups". In particular embodiments, once system tags have been applied to a node for the tag-based user interface 700, the nodes will automatically be linked to or associated with the corresponding groups (e.g., shown as "smart node groups" in FIG. 7) in the hierarchical-tree-arranged user interface 702. Furthermore, in certain implementations, the smart node groups behave like any other user-created node group in the hierarchical-tree-arranged database structure or file system used by the compliance and configuration control tool (e.g., any tasks, rules, and/or policies can be scoped to these groups).

Figure 22:
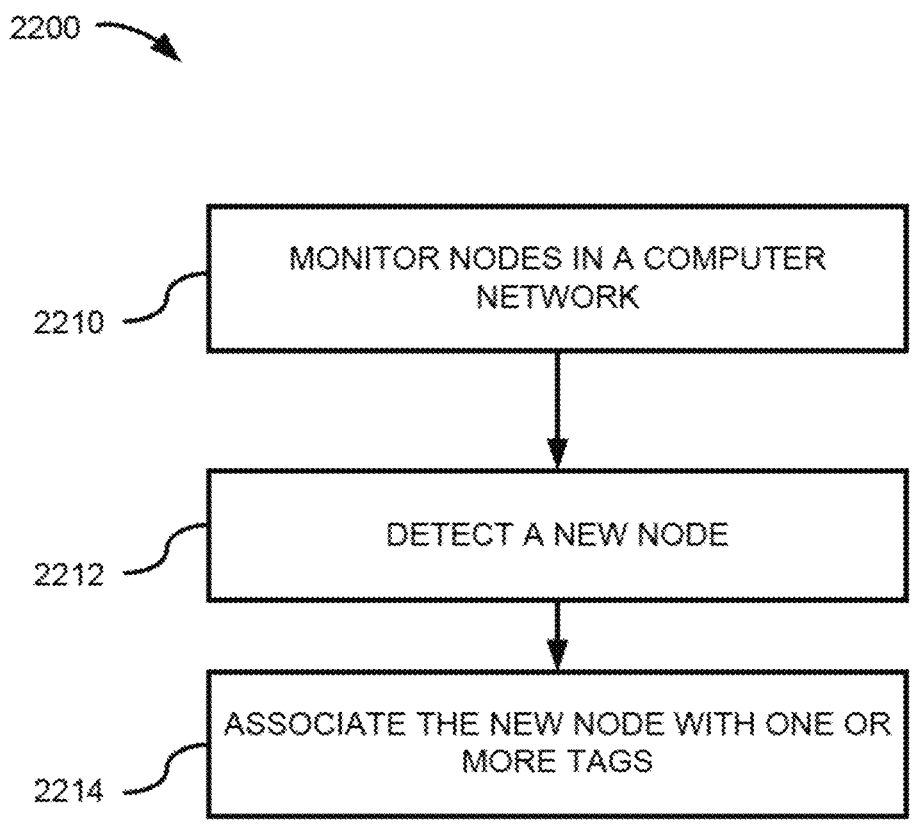
FIG. 22 is a flow chart illustrating one exemplary method for performing automatic tag set creation according to an embodiment of the disclosed technology.

FIG. 22 is a flow chart 2200 illustrating one exemplary method for performing automatic tag set creation according to an embodiment of the disclosed technology. The method acts shown in FIG. 22 should not be construed as limiting, as any one or more of the method acts may be omitted, performed in a different order, or supplemented with one or more additional method acts.

At 2210, nodes in a computer network are monitored (e.g., using a compliance and configuration control tool, such as Tripwire Enterprise). In particular implementations, the nodes comprise one or more of a database server, directory server, file server, network device, or virtual infrastructure.

At 2212, a new node in the computer network is detected (e.g., by the configuration and configuration control tool).

At 2214, the new node is associated with one or more tags. In certain embodiments, this association is performed upon detecting the new node and without user initiation (e.g., the associated is performed automatically). For example, in certain embodiments, certain attributes of the new node are automatically detected (e.g., by the compliance and configuration control tool, which automatically harvests certain system-level data concerning the new node and sends it to an asset manager application for system tag assignments). Using the detected information, one or more tags (e.g., from a system tag set) are automatically mapped or associated with the node. In other embodiments, the tags are applied by applying one or more preset and automatically applied tagging profiles (discussed in more detail below) to the new node, each tagging profile comprising a set of one or more conditions that, if satisfied by the new node, cause the new node to be associated with one or more respective tags of the tagging profile. In still other embodiments, tagging is automatically performed based on tagging instructions or tagging profiles established by a third-party software component that communicates with the asset manager via a suitable API. In this way, a third-party component can leverage the monitoring and harvesting capabilities of a compliance and configuration control tool as well as the tagging capabilities of the disclosed technology. (It should be noted that any of the features and aspects of the disclosed technology can be accessed and controlled by a third-party software component via a suitable API.)

In some embodiments, the tag is a keyword or term (e.g., a non-hierarchical keyword or term) that is assigned to the node (e.g., as metadata or as a field in a database storing nodal information for the information technology network), thereby associating the tag with the node. The tags assigned to the new node can be any one or more tags, but in certain embodiments relate to system-level tags that relate to basic system information, such as the operating system used by the new node, the directory service used by the new node (if the node is a server), and/or the monitoring status of the new node (e.g., a monitoring status performed by the compliance and configuration control tool). In certain embodiments, the tags are displayed in a first panel of a display screen, and, upon user selection of a respective one of the tags, nodes associated with the respective one of the tags are displayed in a second panel of the display screen. For example, in FIG. 6, the automatically created tags are shown as "system tag sets" in the asset filter pane 410.

Figure 23:
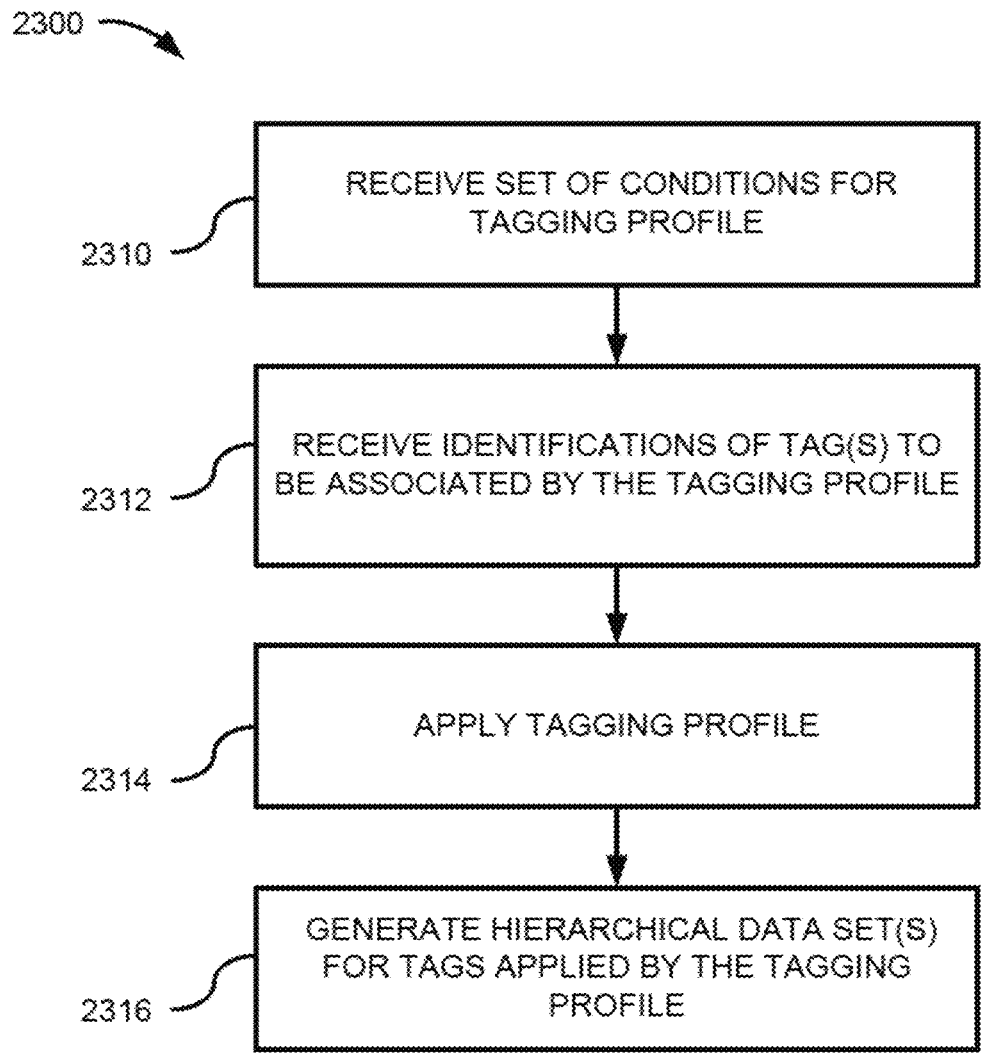
FIG. 23 is a flow chart illustrating one exemplary method for creating tag sets and automatically generating corresponding groups in a hierarchically arranged database or file system usable by a hierarchical-tree-based compliance and configuration control tool.

FIG. 23 is a flow chart 2300 illustrating one exemplary method for creating tag sets and automatically generating corresponding groups in a hierarchically arranged database or file system usable by a hierarchical-tree-based compliance and configuration control tool (e.g., Tripwire Enterprise). The method acts shown in FIG. 23 should not be construed as limiting, as any one or more of the method acts may be omitted, performed in a different order, or supplemented with one or more additional method acts.

At 2310, a set of conditions is received and used to establish a tagging profile. For example, the set of conditions can comprise a first condition specifying a first node property and a second condition specifying a second node property (e.g., the conditions can be received via user input, such as through a tagging profiles interface, an example of which is discussed below with reference to FIG. 12). In general, the set of conditions specifies a set of one or more conditions that must be satisfied by a node before the node is assigned a tag associated with the tagging profile (e.g., by the node satisfying one of the specified conditions in the set, or all of the conditions specified in the set).

Figure 8:
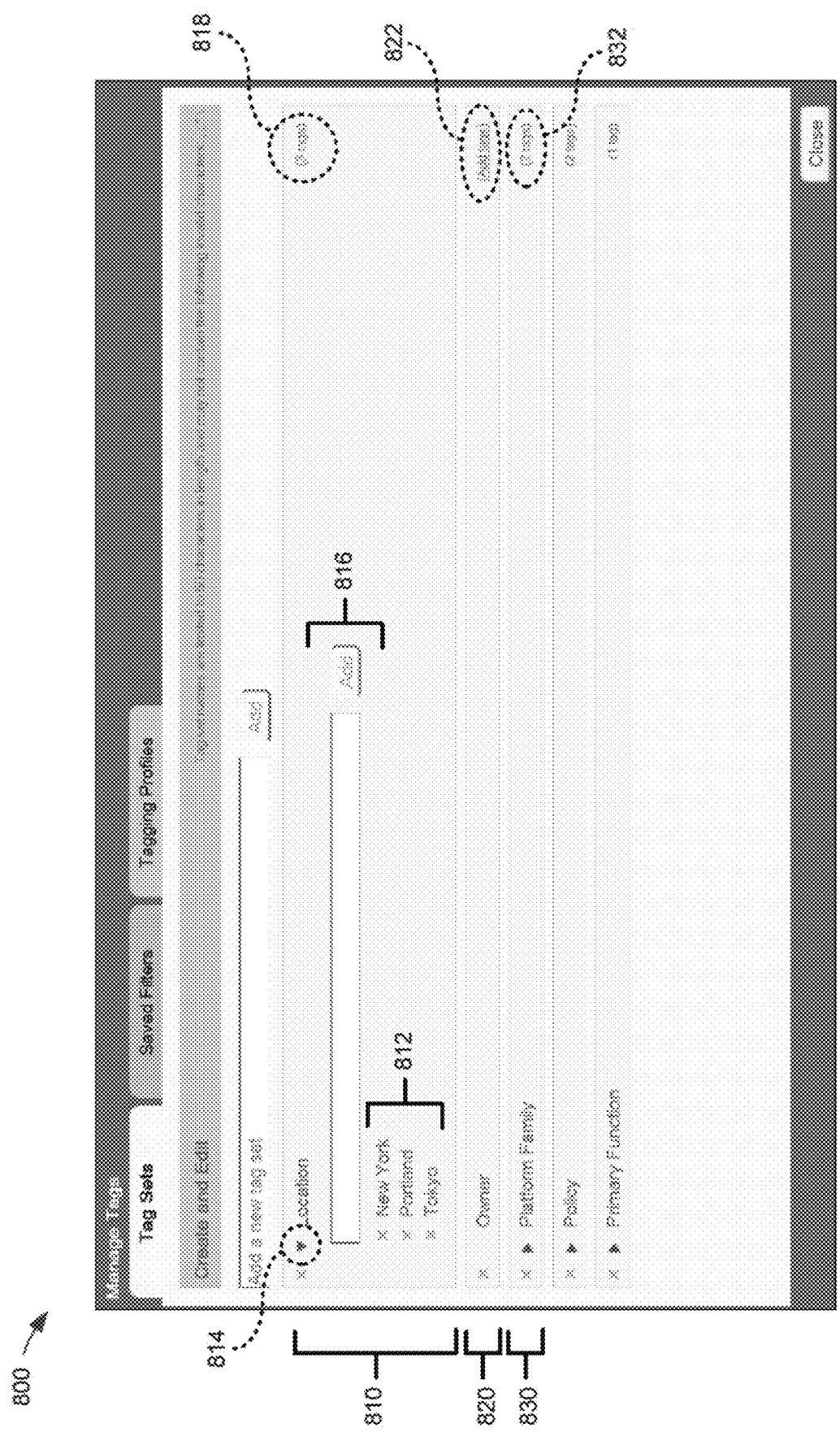
Figure 13:
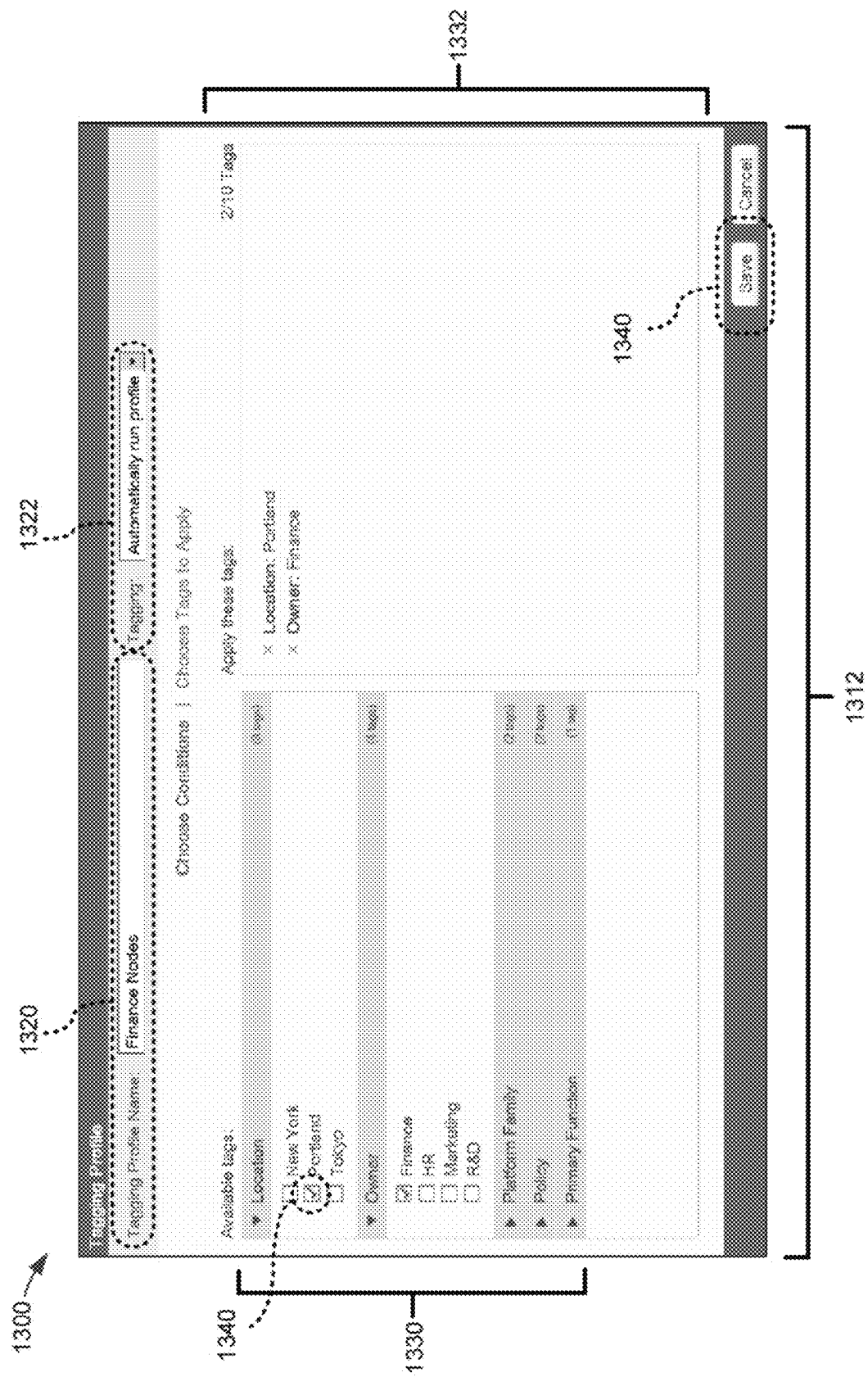

At 2312, identifications of one or more tags associated with the tagging profile are received (e.g., via user input, such as through a tagging profiles interface or tag managing interface, examples of which are discussed below with reference to FIG. 8 and FIG. 13).

At 2314, the tagging profile is applied to nodes in an information technology network. The application of the tagging profile can be performed, for example, by assigning the one or more tags associated with the tagging profile to one or more nodes of the information technology network that satisfy one or more conditions of the set of conditions specified in the tagging profile, and thereby generating a tagged set of nodes. For example, in certain embodiments, the user can select whether all conditions of the set must be satisfied or a subset of the conditions of the set must be satisfied before assigning tags (e.g., any one condition of the set). In certain embodiments, the tag is a keyword or term (e.g., a non-hierarchical keyword or term) that is assigned to the node (e.g., as metadata or as a field in a database storing nodal information for the information technology network).

At 2316, a corresponding data set that comprises the tagged set of nodes is generated in a hierarchical database or file system. The hierarchically-arranged database or file system can have a structure or arrangement that is configured to be used by a compliance and configuration control tool (e.g., Tripwire Enterprise). One example of such a hierarchical file system is illustrated in FIG. 7.

In certain embodiments, the method of FIG. 23 is performed by a monitoring and control computer in the information technology network (e.g., a computer running the compliance and configuration control tool). Such a computer is typically controlled by an IT administrator in a company or organization. A compliance and configuration control tool can then be used to apply a rule (or other policy) to the tagged set of nodes in the data set. For instance, in one example, the rule can identify a criterion by which a detected configuration change to the node is to be stored and transmitted to the monitoring computer.

Examples of Tag Set Interfaces and Methods

In certain embodiments, a user can create tag sets, comprising a group of tags associated by a common characteristic, category, or classification. For example, a tag set management interface can be accessed from a main asset view interface (e.g., by selecting a "manage" button 440 displayed on the asset view interface 400). FIG. 8 is a screenshot 800 of a tag set management interface. By using the tag set management interface, a user can create customized tag sets by which one or more tags are identified as having a certain characteristic or relating to a certain category or classification of data type. The tag set management interface of FIG. 8 also allows a user to edit and manage existing tag sets. Generally speaking, a "tag set" refers to a category (or set) of one or more tags that are interrelated, whereas a tag itself refers to a particular characteristic (or tag) within a tag set. For example, and as shown in screenshot 800, tag set display 810 is named "location" and refers to tags that are interrelated to each other because the tags each indicate an asset's location. Tags 812 within the tag set display 810 include specific tags for "New York", "Portland", and "Tokyo". When a particular tag set is selected for management (e.g., by selecting the arrow 814 that expands a given tag set selection), the tags within the tag set are displayed along with a tag addition area 816 for adding one or more additional tags to the tag set. The tag set display 810 also includes a counter 818 showing the number of tags associated with the tag set. The counter 818 is displayed both when the tag set display 810 is expanded or collapsed. For example, tag set display 830 for "platform family" includes a counter 832 that shows that there are two tags associated with the tag set. Further, tag set display 820 for "owner" includes an "add tags" selector 822 indicating that there are no tags associated with the tag set but providing a clickable selector that will expand the tag set display and allow a user to add one or more tags (through a tag addition area). Deleting a tag or tag sets can be accomplished by clicking the "x" to the left of the tag or tag sets. When finished, a user can exit the tag set management interface by selecting the close button in the lower right of the screen.

In certain implementation, to apply tags, a user first identifies the assets to which the tags are to be added. This identification can be performed using the asset view screen 400. In particular, a user can select one or more nodes from the asset list pane 412 (by selecting the checkbox next to the one or more nodes to be selected). The one or more selected nodes then appear in the selection information pane 414. When multiple assets are selected, they appear by name in the selection information pane 414. As seen in the asset view screen 400, an "edit tags" selector 442 appears in the selection information pane 412. By selecting the "edit tags" selector 442, a tag editing interface is opened.

Figure 9:
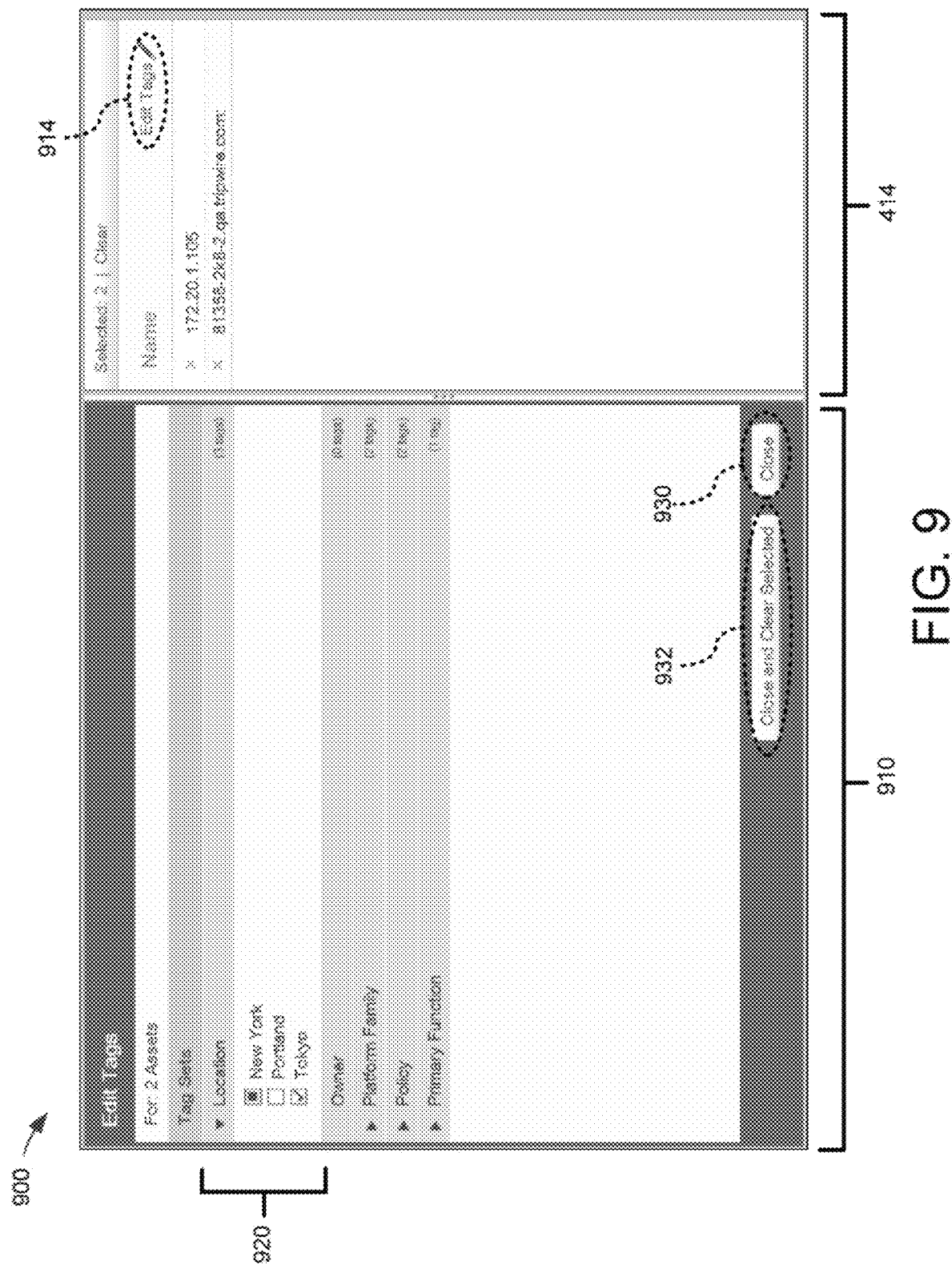

FIG. 9 is a screen shot of an exemplary tag editing screen 900 that includes a tag editing interface 910 (sometimes also referred to as the asset drawer) that opens adjacent to the selection information pane 414. In the screen 900, the two nodes are displayed in the selection information pane 414. Also visible is an "edit tags" selector 914 for the selected tags. The tag editing interface allows a user to choose which tags should be applied to the selected assets. The tag editing interface can also be used to remove tags from selected assets. In general, the tag editing interface 910 lists the available tag sets, which can each be expanded to show the tags within each given set (e.g., by selecting the rotatable arrow icon associated with each tag set). An expanded tag set display 920 for the "location" tag set is shown in FIG. 9.

Once expanded, the tags of the tag set are displayed along with a respective selector box for each tag. In the illustrated embodiment, a solid square indicates that the tag is applied to some of the selected assets, a checkmark indicates that it is applied to all the selected assets, and an empty checkbox indicates that it is applied to none of the selected assets. A user can make changes by clicking on the checkbox to either apply the tag (changing the checkbox to include a checkmark) or remove a tag (changing the checkbox to an empty checkbox). In the illustrated embodiment, two assets are selected for having their tags edited ("172.20.1.105" and "81356-02k8-2.qa.tripwire.com"), but the user can modify the tags for a single one of the assets simply by removing the other asset from the selection information pane 414 (e.g., by selecting the "x" adjacent to the asset). In the illustrated embodiment, changes are applied when the user clicks either a "close" button 930 or "close and clear selected" button 932, the difference being that the "close" button simply closes the tag editing interface 900, whereas the "close and clear selected" button closes the tag drawer and also clears the selected assets from the selection information pane 414.

Examples of Tagging Profile Interfaces and Methods

As noted above, embodiments of the compliance and configuration control tool have the capability of automatically applying system tags to nodes based on their operating system, device type, and/or other criteria. Certain embodiments of the disclosed technology include the ability for a user to customize a set of tagging rules, which can then be applied to the available assets. In this discussion, the customized sets of tagging rules (or conditions) are termed "tagging profiles". In general, tagging profiles allow a user to specify additional tags that should be applied to assets based on one or more characteristics. In certain implementations, the tagging profiles can be configured to be automatically applied to new assets as they are added to an IT environment and monitored by the compliance and configuration control tool and/or they can be run manually to apply tags to the assets.

Figure 10:
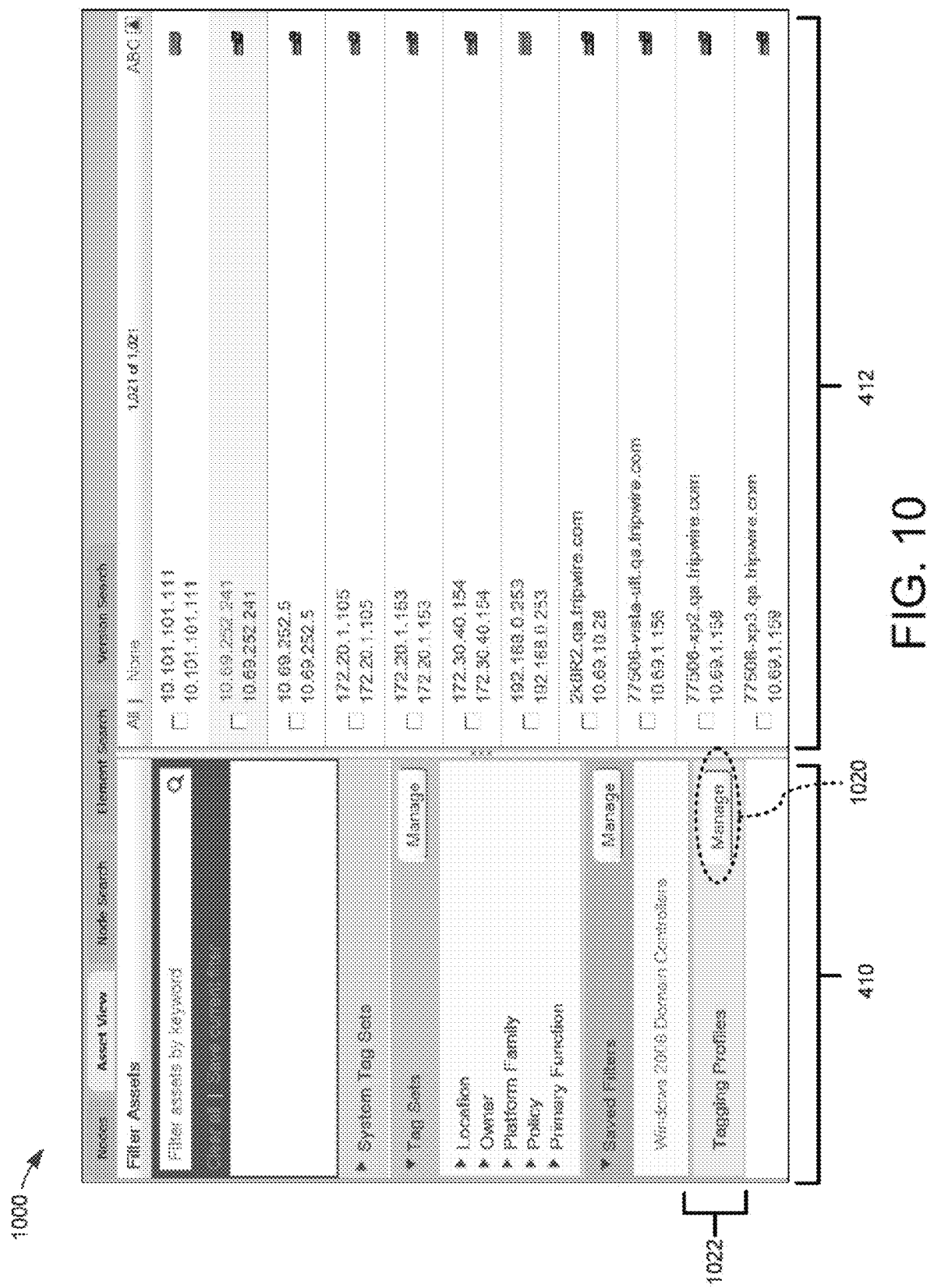

In certain implementations, tagging profiles can be managed by clicking on a "manage" button associated with "tagging profiles" and displayed on the asset filter pane of the asset view screen. For example, FIG. 10 is a screenshot of a portion of an asset view screen 1000 in which an asset filter pane 410 includes a manage button 1020 associated with a tagging profiles area 1022.

Figure 11:
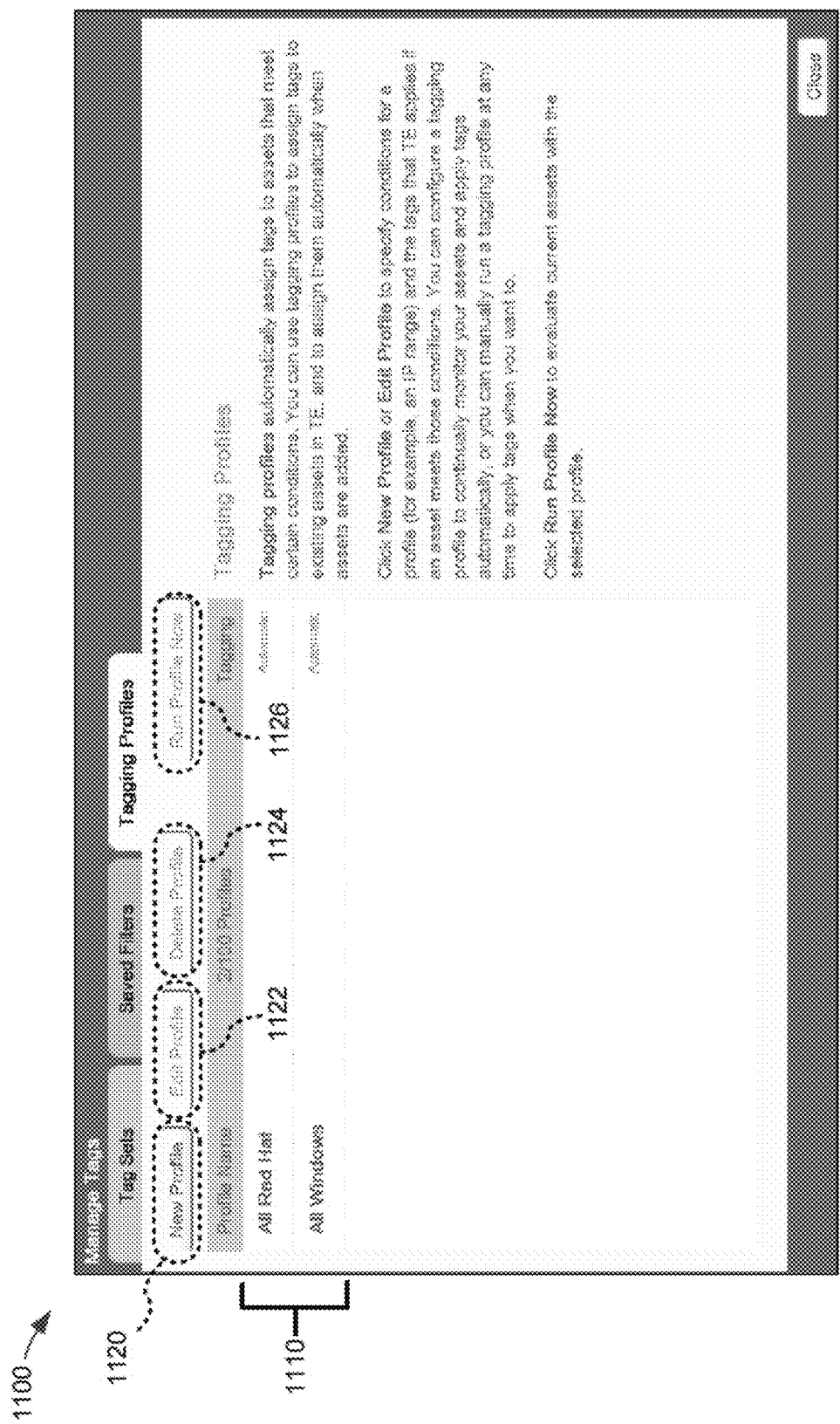

Upon selecting the manage button 1020, a tagging profiles interface is opened. For example, FIG. 11 is a screenshot of an exemplary tagging profiles interface 1100 (displayed as a tab among various other tabs for managing tags). In the illustrated implementation, the tagging profiles interface 1100 includes a list of tagging profiles 1110 along with several options for managing a selected one of the tagging profiles. In particular, a user can create a new profile (by selecting "new profile" button 1120), edit an existing profile (by selecting "edit profile" button 1122), delete a profile (by selecting "delete profile" button 1124), or run the selected profile (by selecting "run profile now" button 1126).

Figure 12:
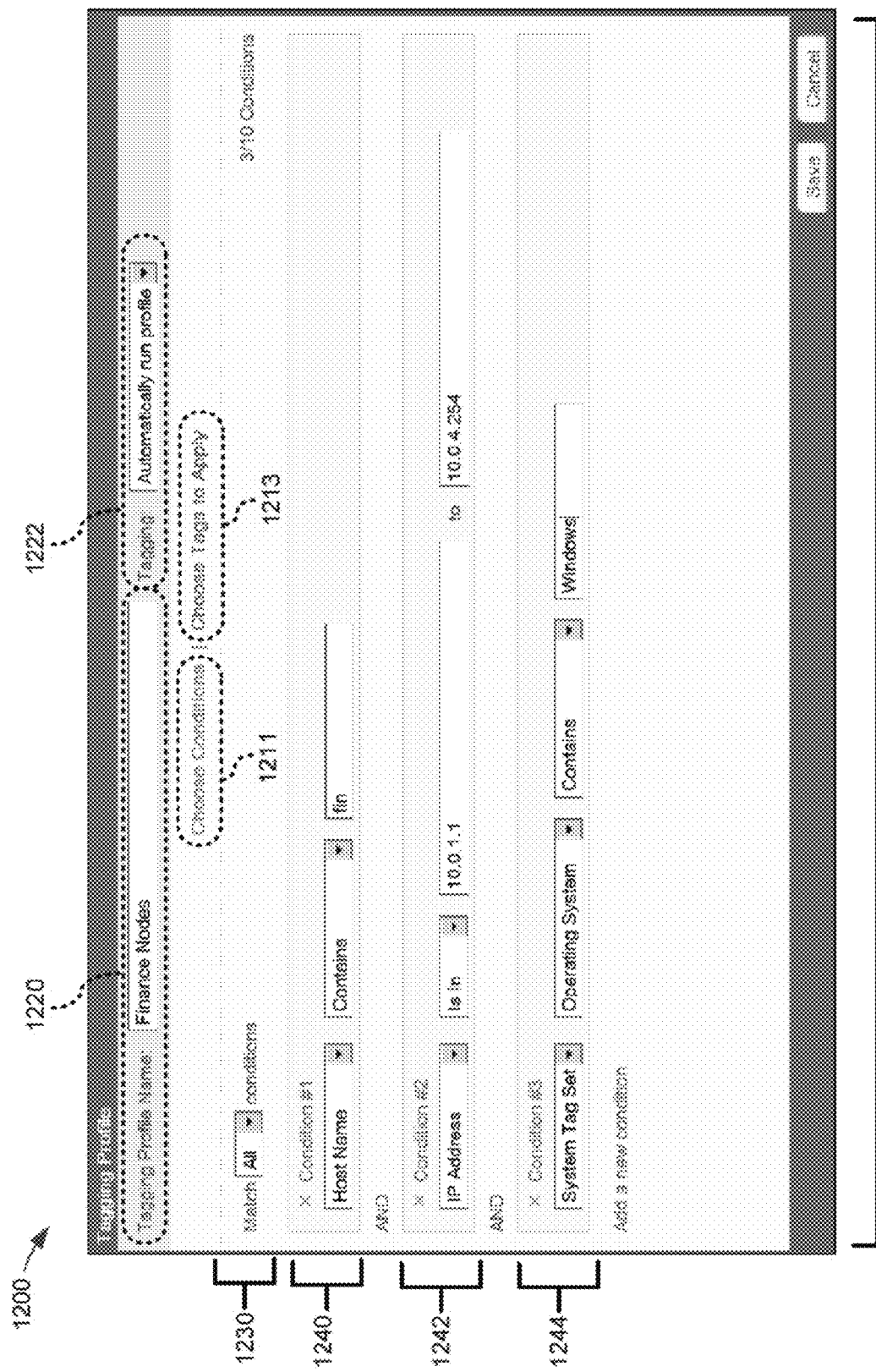

In the illustrated implementation, to create new profile, a user can click the new profile button 1120, causing a new tagging profile interface to open. For example, FIG. 12 is a screenshot of an exemplary new tagging profile interface 1200. In particular, the new tagging profile interface 1200 allows a user to select a "choose conditions" screen 1210 (using selector 1211) or a "choose tags to apply" screen (using selector 1213). In FIG. 12, the choose conditions screen 1210 is displayed. In the illustrated choose conditions screen 1210, a tagging profile name area 1220 is displayed in which a user can supply a name. Additionally, a tagging application selector area 1222 is shown in which the user can select to either run the profile automatically as new nodes are added or to run the profile manually (e.g., after prompting by a user). Further, the choose conditions screen 1210 shown in FIG. 12 includes several screen portions for selecting how and what criteria comprise the tagging profile. For example, matching criteria selector box 1230 allows a user to select whether the tagging profile is satisfied when all or any condition of the tagging profile are met. In the illustrated screenshot, the user has selected that "all" conditions of the tagging profile must be met before an asset is added to the one or more tags specified by the tagging profile. In general, the selection of all conditions or any condition will change the Boolean operator used to link the conditions of the tagging profile (e.g., when "all" is selected, the conditions will be linked by an "AND" operator; whereas when "any" is selected, the conditions will be linked by an "OR" operator). In general, the conditions used to define a tagging profile can be any condition of a node that is monitored and available to the compliance and configuration control tool. In the illustrated implementation, the conditions comprise host name, IP address, and system tag sets, but can include additional, alternative, or fewer conditions. For host name condition selection area 1240, various matching criteria can be selected, including that the host name "contains" the designated set of characters (e.g., "fin" in FIG. 12), "begins with" the designated set of characters, "ends with" the designated set of characters, and/or "exactly matches" the designated set of characters. Other matching criteria can additionally or alternatively be used. For IP address condition selection area 1242, various matching can also be selected. For instance, as illustrated, the IP address can be matched to a range of IP addresses using the "is in" matching criteria. Or, the matching criteria can require an exact match to a particular IP address, or can "contain", "begin with", and/or "end with" a specified IP address. For system tag set selection area 1244, a selection area is provided that allows a user to select a desired system tag set from among the available system tag sets (e.g., "operating system" as shown) as well as a matching criteria selector that allows a user to select from among various matching criteria (e.g., "contains", "exactly matches", "begins with", "ends with", and/or other such criteria). The tag set selection area 1244 additionally includes an area in which a designated name for matching can be insert (e.g., "Windows" as shown in FIG. 12). One or more additional conditions can be added to the tagging profile as desired. Of course, fewer conditions can also be used to create the tagging profile. In the illustrated example, then, nodes whose hostname contains "fin" and whose IP address is between "10.0.1.1" and "10.0.4.254" and whose operating system (according to the automatically applied system tag set) contains "Windows" would satisfy the tagging profile called "Finance Nodes".

Figure 14:
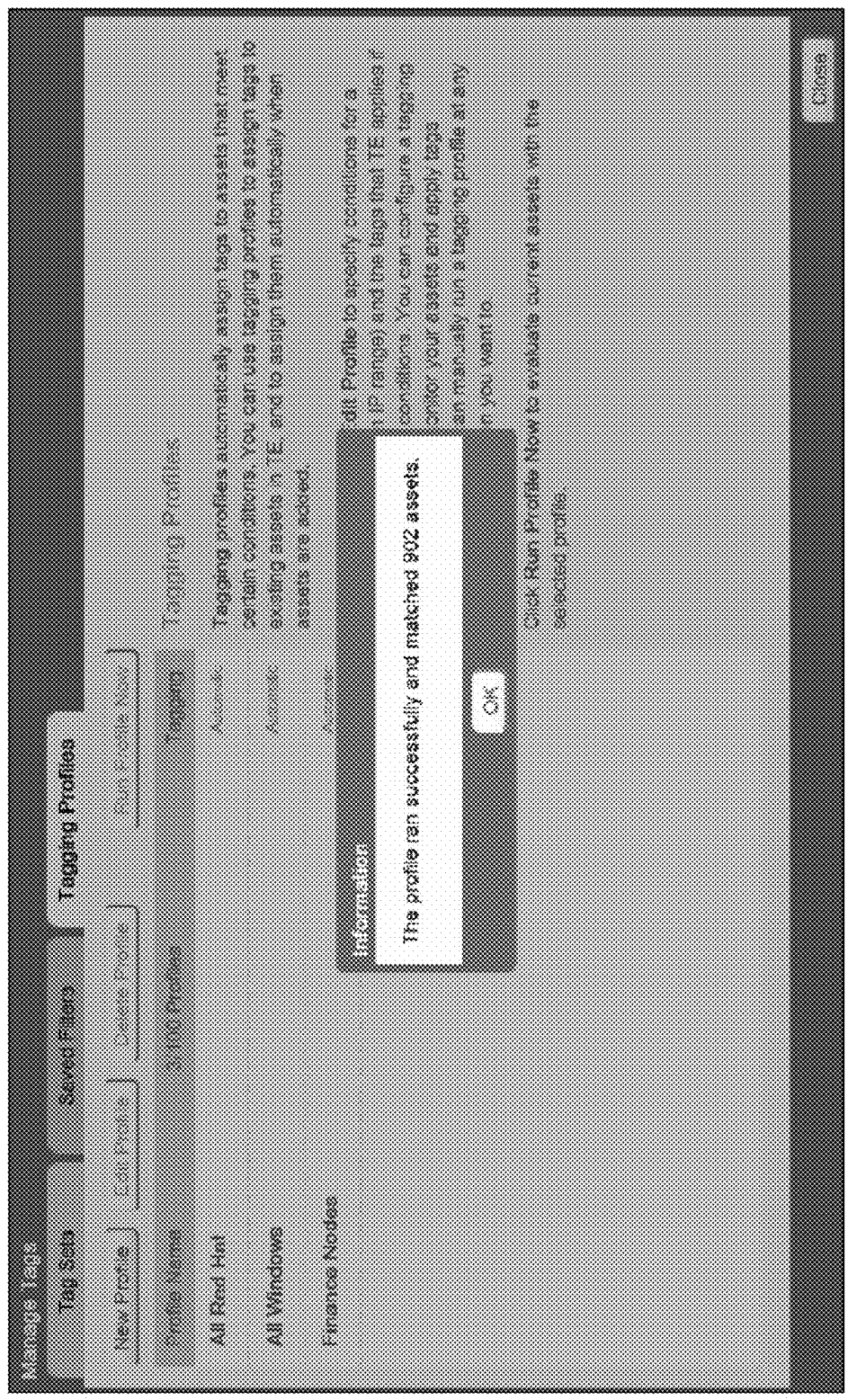

As noted, the new tagging profile interface 1200 also includes a screen through which a user can select which tags to apply to nodes satisfying the conditions of the tagging profile. In the illustrated implementation, this screen is accessed by selecting the "choose tags to apply" selector 1213. FIG. 13 is a screenshot of an exemplary "choose tags to apply" screen 1312 for the new tagging profile interface. In the illustrated "choose tags to apply" screen 1312, a tagging profile name area 1320 is displayed in which a user can supply a name to change the tagging profile. Additionally, a tagging application selector area 1322 is shown in which the user can select to either run the profile automatically as new nodes are added or to run the profile manually (e.g., after prompting by a user). Also shown in the screen 1312 is an available tags display 1330 comprising expandable displays of the available tag sets. As shown, once expanded, each tag set display identifies each tag associated with the set along with a selectable checkbox (e.g., checFkbox 1340 associated with the "Portland" tag in the "location" tag set). When checked, the associated tag will be applied to nodes matching the selected tagging profile. Screen 1312 also includes a selected tags display 1332 that lists the tags that have been selected to be applied upon satisfaction of the conditions for the tagging profiles. For example, in the illustrated example, the tag "Portland" in the tag set "location" and the tag "finance" in the tag set "owner" will be applied when the conditions for the tagging profile "finance nodes" are satisfied. Tags can be added or removed by either selecting the appropriate check box from the available tags display 1330 or by selecting the "x" button for a tag on the selected tags display 1332. After choosing the tags that should be applied, a user can click a "save" button 1340 in the lower right of the screen 1312. If the profile is set to be applied manually, and in certain implementations, nothing will happen until the profile is selected in the list of tagging profiles 1110 from the tagging profiles interface 1110 and the "run profile now" button 1126 is clicked. On the other hand, if the profile is set to run automatically, then in certain embodiments of the disclosed technology, the profile will be run automatically and attempt to match nodes to the profile conditions (e.g., at regular intervals and/or upon detection of a new node). FIG. 14 shows a screen 1400 after a tagging profile is run in which an information area appears informing the user of the number of assets matched to the selected tagging profile. In the illustrated example, for instance, the selected tagging profile ran successfully and matched "902" assets.

Figure 24:
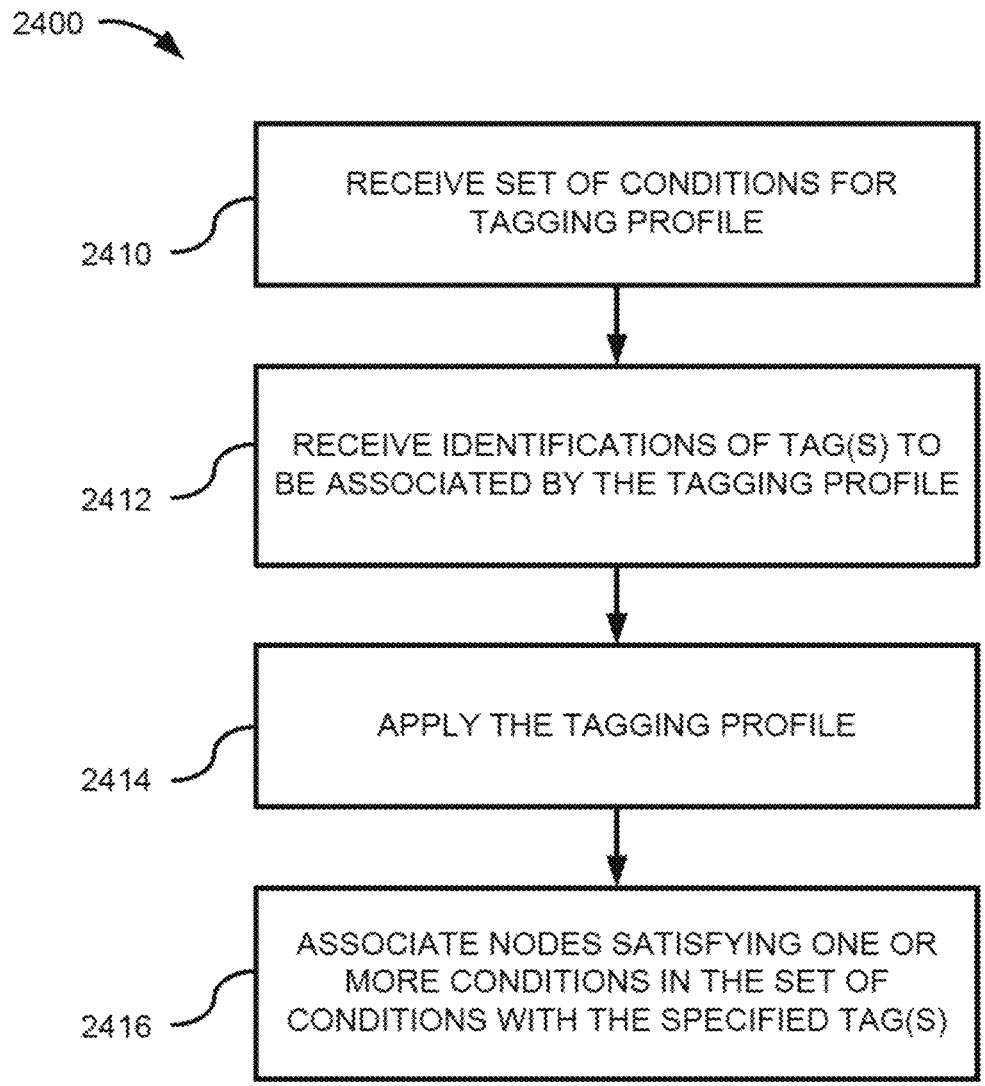
FIG. 24 is a flow chart illustrating one exemplary method for creating and applying a tagging profile.

FIG. 24 is a flow chart 2400 illustrating one exemplary method for creating and applying a tagging profile. The method acts shown in FIG. 24 should not be construed as limiting, as any one or more of the method acts may be omitted, performed in a different order, or supplemented with one or more additional method acts.

At 2410, a set of conditions to establish a tagging profile is received. The set of conditions can comprise a first condition specifying a first node property and a second condition specifying a second node property. For example, the tagging profile interface shown in FIG. 24 can be used by a user to specify the one or more conditions in the set.

At 2412, identifications of one or more tags associated with the tagging profile are received. For example, the interfaces shown in FIG. 8 and/or FIG. 13 can be used by a user to identify the tags to be associated with the tagging profile.

At 2414, the tagging profile is applied to nodes in an information technology network by determining one or more nodes in the information technology network that satisfy the set of conditions. For example, one or more databases and/or file systems that are maintained and that include asset information for the assets in the IT environment can be searched for nodes having properties that satisfy the specified set of conditions. Any of a variety of searching options can be used (e.g., as discussed above with respect to FIG. 21).

At 2416, the one or more tags are associated with the nodes that satisfy the one or more conditions of the set of conditions. For example, in certain embodiments, the tag is a keyword or term (e.g., a non-hierarchical keyword or term) that is assigned to a respective matching node (e.g., as metadata or as a field in a database storing nodal information for the information technology network), thereby associating the tag with the one or more respective nodes.

After the application of the tagging profile, a list of the tags can be displayed in a first pane of an interface (e.g., as shown in FIGS. 4-6). Further, and as described above, after user selection of a respective one of the tags, a list of the nodes associated with the respective one of the tags can be displayed in a second pane of an interface (e.g., as shown in FIG. 6). In certain embodiments, and as explained above, the determining and the associating acts at 2414 and 2416 can be performed automatically as a new node is introduced to the information technology network. In some implementations, a user is allowed to select whether the tagging profile is to be applied automatically or manually (e.g., as shown in FIG. 12). In particular implementations, the nodes comprise one or more of a database server, directory server, file server, or network device. As noted above, one or more of the conditions for a tagging profile can be that a node be within a range of internet protocol addresses, that a node have a name or attribute that matches a user-selected set of characters, and/or that a node be tagged with a selected tag, the selected tag being different than the one or more tags associated with the tagging profile. Additionally, and as shown in FIG. 12, the user can allowed to select whether all conditions of the set or less than all conditions must be satisfied before associated nodes with the one or more tags.

Examples of Saved Filter Interfaces and Methods

Figure 15:
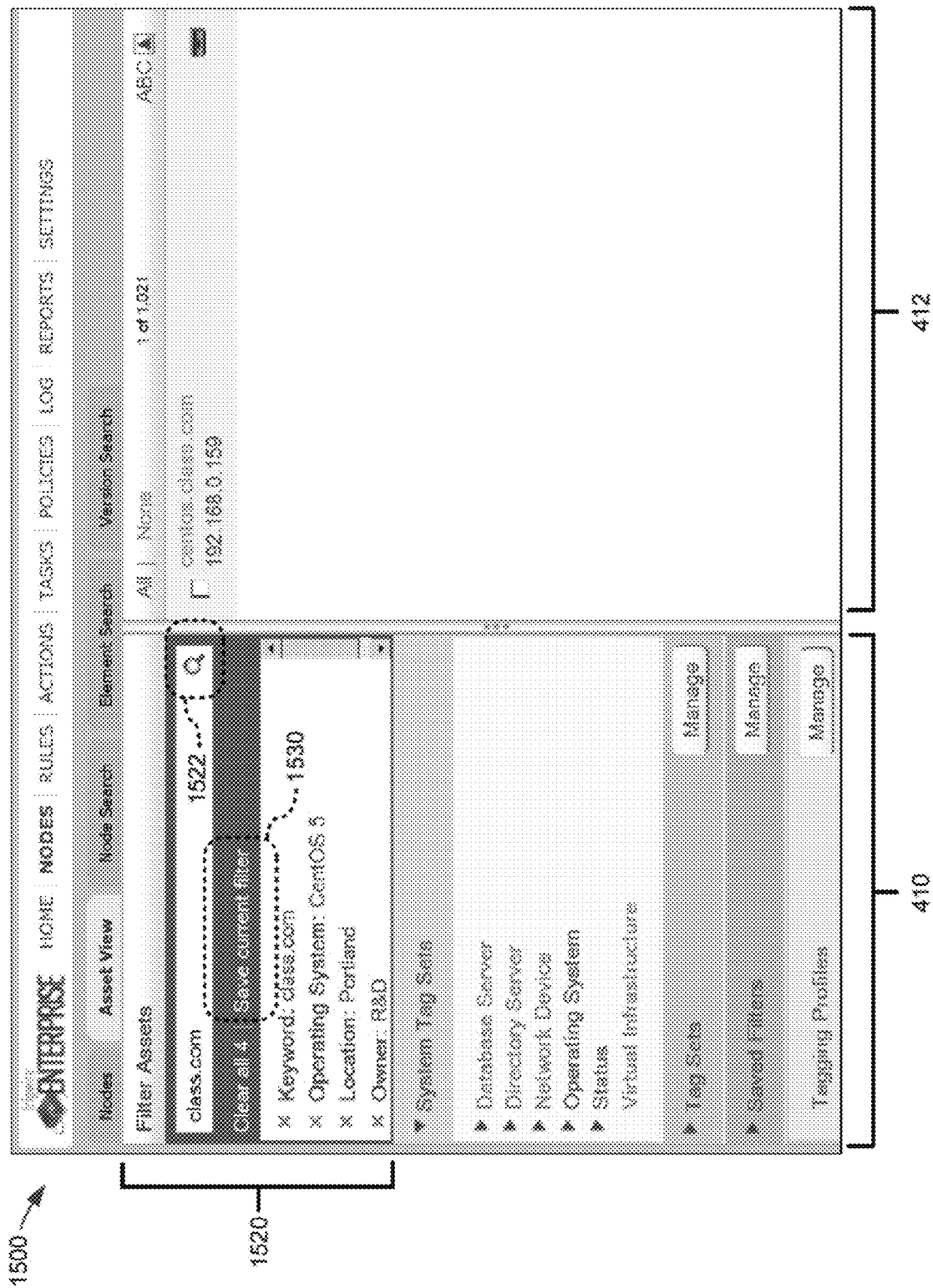

By using tags and keywords, embodiments of the tag-based asset monitoring and management scheme disclosed herein allow a user to quickly filter the list of assets to only show assets of interest. For example, if a user wants to find out information about a node and the user only knows part of its name (a keyword), the operating system it is running (a system tag), and/or its location and owner (tags), this information can be used to quickly create a filter that locates the matching node. For example, FIG. 15 shows a screenshot of an asset view screen 1500 where the asset filter pane 410 is used to create a filter that includes the keyword "class-.com", the operating system tag "CentOS 5", the location tag "Portland", and the owner tag "R&D", all of which are displayed in the asset filter area 1520. Upon clicking the search button 1522, the results can be displayed in the asset list pane 412. Further, in certain implementations, all tags are considered to be keywords, but not all keywords are tags. In other words, a user can use tag information in keyword filter fields to match assets with corresponding tags. More commonly, though, a user will use keywords that are not tags in keyword filter fields, such as the full or partial name or IP address of a node. Further, in certain implementations, the asset filter treats multiple filter criteria according to a unique matching strategy. In particular, in certain implementations, the asset filter interprets criteria in the same tag set, system tag set, or saved filter using a logical OR operator; and criteria from different tag sets or saved filters using a logical AND operator. For example, if a user uses "Location: Portland", "Location:New York," and "Owner:R&D" as filter criteria, the asset list pane (e.g., asset list pane 412) will display all assets that R&D owns AND that are in either Portland OR New York. This is because Portland and New York are in the same tag set (Location), whereas R&D belongs to another tag set (Owner).

Figure 16:
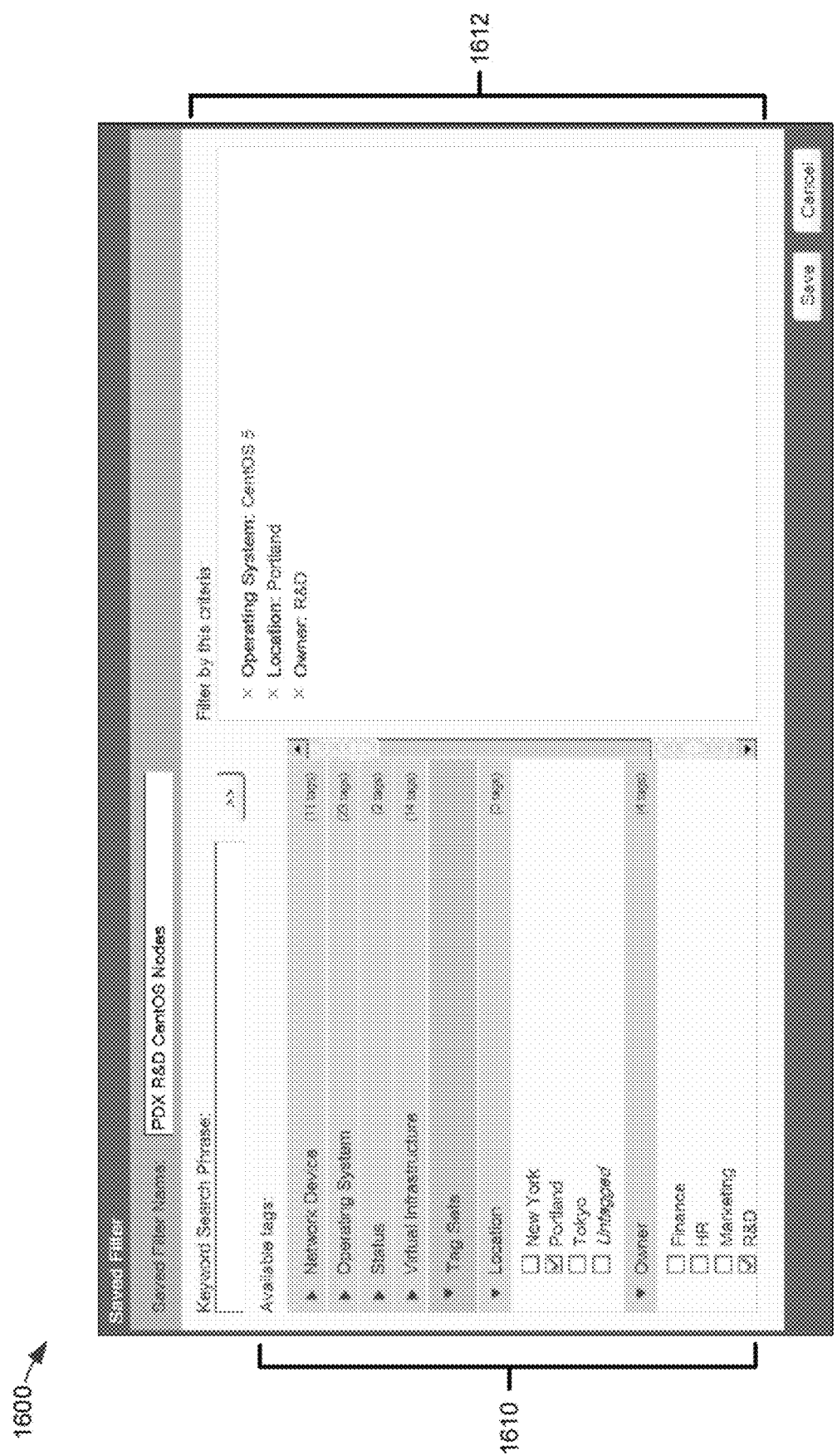

Adding tags by selecting them from the asset filter pane and typing keywords into the keyword filter field allows a user to quickly and easily build and see all assets that fall in the scope of the filter in the asset list pane. This query can then be saved. For example, the current filter can be saved by clicking on the "save current filter" button 1530 displayed with the keyword filter field. By selecting to save the current filter, a saved filter interface can be opened where the user can name the filter and refine it, as desired. FIG. 16 is a screenshot of an exemplary saved filter interface 1600 where a user can name the filter, refine it, and then save the filter. In particular, the saved filter interface 1600 includes an available tag display 1610 of the available tags, which are expandable to show the particular tags associated with each tag sets. Additionally, the saved filter interface 1600 includes a "filter by this criteria" display 1612 that shows the selected criteria by which filtering is to be performed. As can be seen, a user can modify the filtering criteria by either selecting or deselecting the checkboxes associated with each tag or by selecting to remove a criteria from the filter by clicking an "x" on the "filter by this criteria" display 1612.

Figure 17:
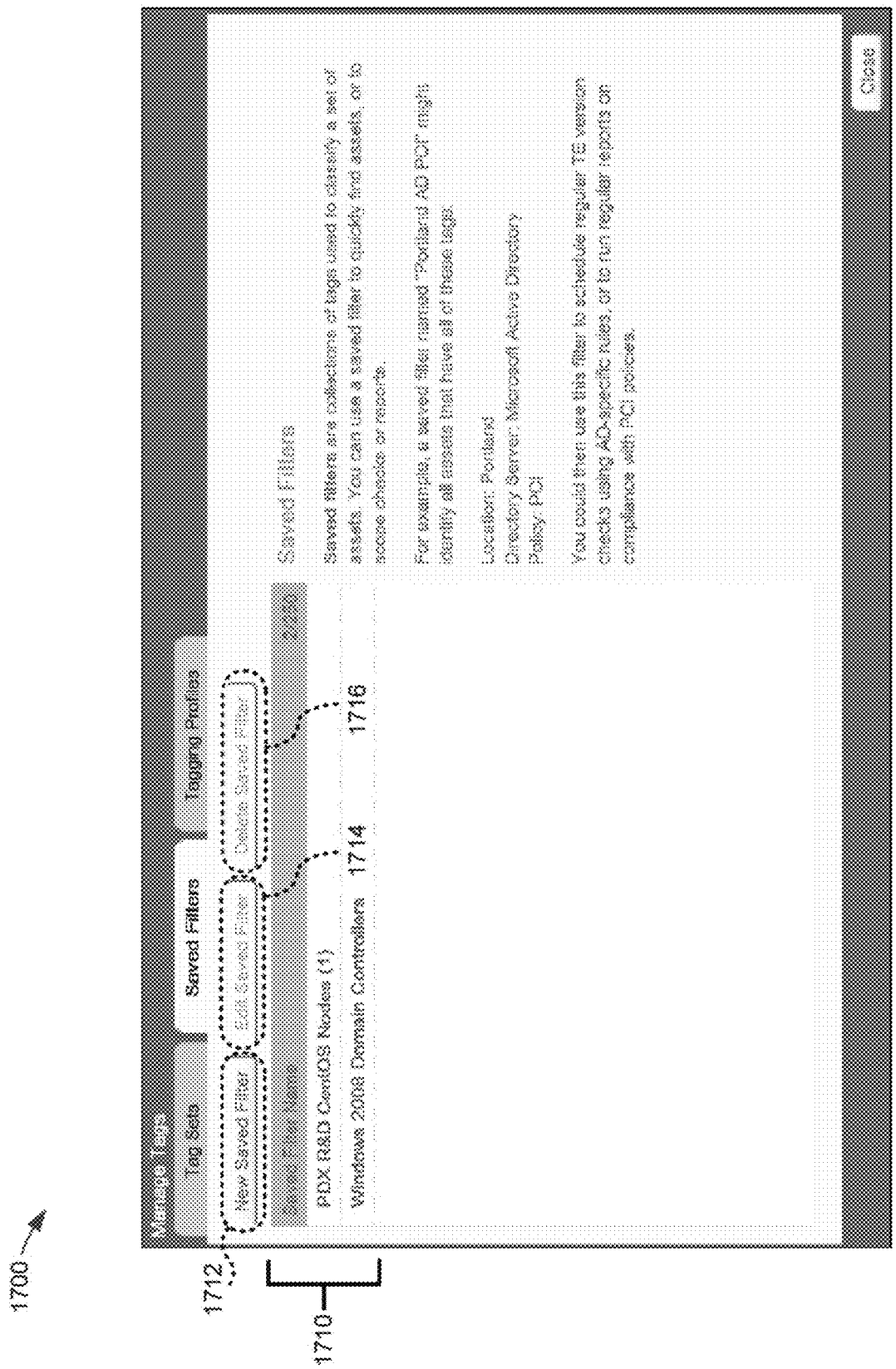

In certain embodiments, new saved filters can be created and existing saved filters can be edited or deleted by clicking on a "manage" button (e.g., "manage" button 540 shown in FIG. 5) associated with a saved filters display on the asset filter pane. By selecting the "manage" button, a saved filters management interface is opened. FIG. 17, for example, is a screenshot of an exemplary saved filters management interface 1700 (displayed as a tab among various other tabs for managing tags). The saved filters management interface 1700 includes a saved filters list 1710 in which saved filters are displayed, a "new saved filter" button 1712 for initiating a new saved filter, an "edit saved filter" button 1714 for editing a selected saved filter, and a "delete saved filter" button 1716 for deleting a selected saved filter.

Figure 18:
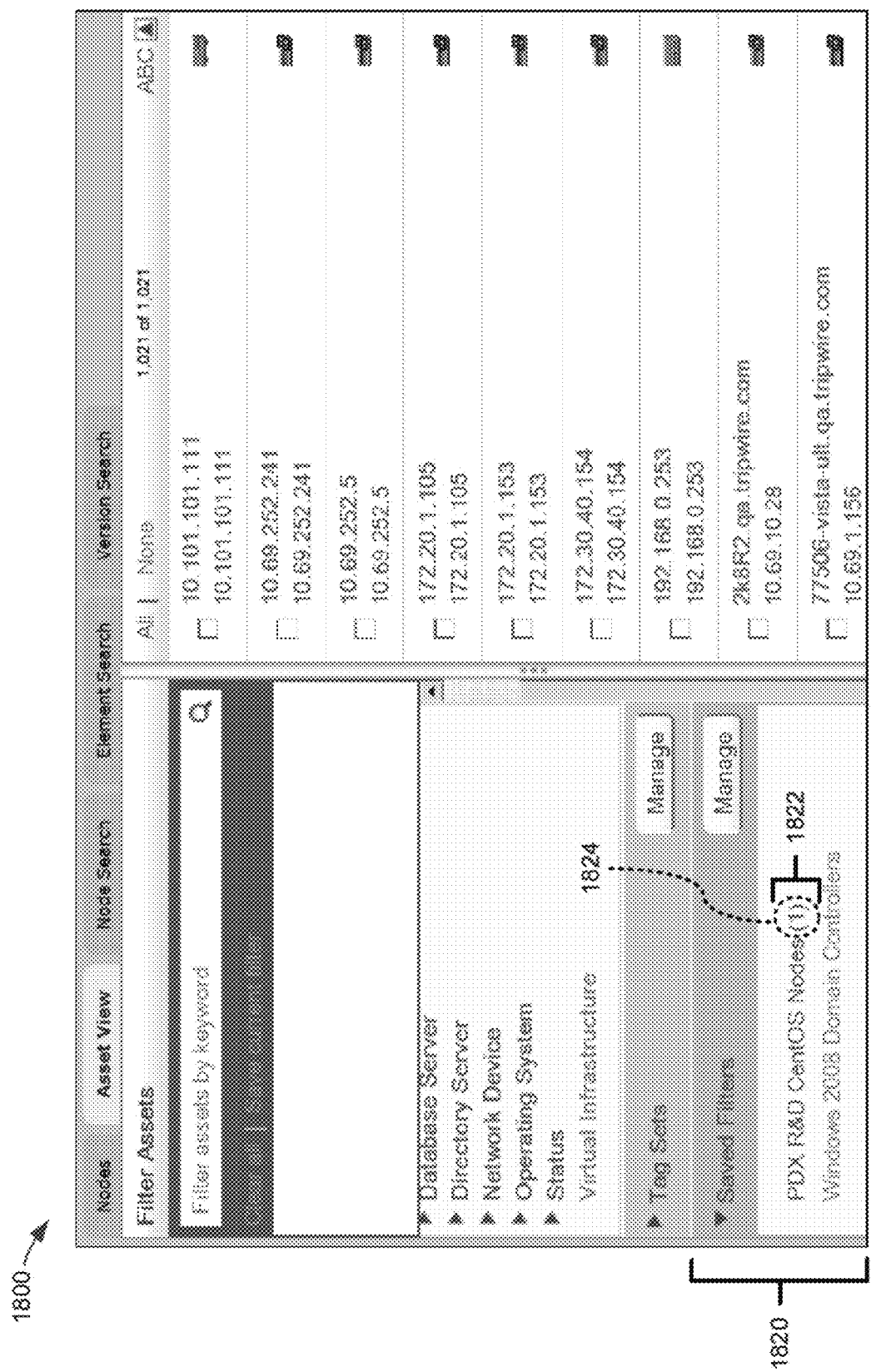

Once a filter has been created and saved, it will appear in the saved filters display on the asset view screen. For example, FIG. 18 is a screenshot of an asset view screen 1800 that shows a saved filters display 1820 on an asset filter pane 410 that includes a saved filter 1822 entitled "PDX R&D CentOs Nodes". Also shown in the saved filters display 1820 is a dynamically updated counter 1824 that identifies the number of nodes that satisfied the criteria of the saved filter after its last application. For example, in the illustrated implementation, the counter 1824 shows that "1" node is currently associated with the saved filter. In particular implementations, a filter is applied only upon a user clicking on the filter, thereby causing the filter to be run and its criteria edited. In other implementations, one or more filters are automatically and/or continuously applied (e.g., at regular intervals).

Figure 19:
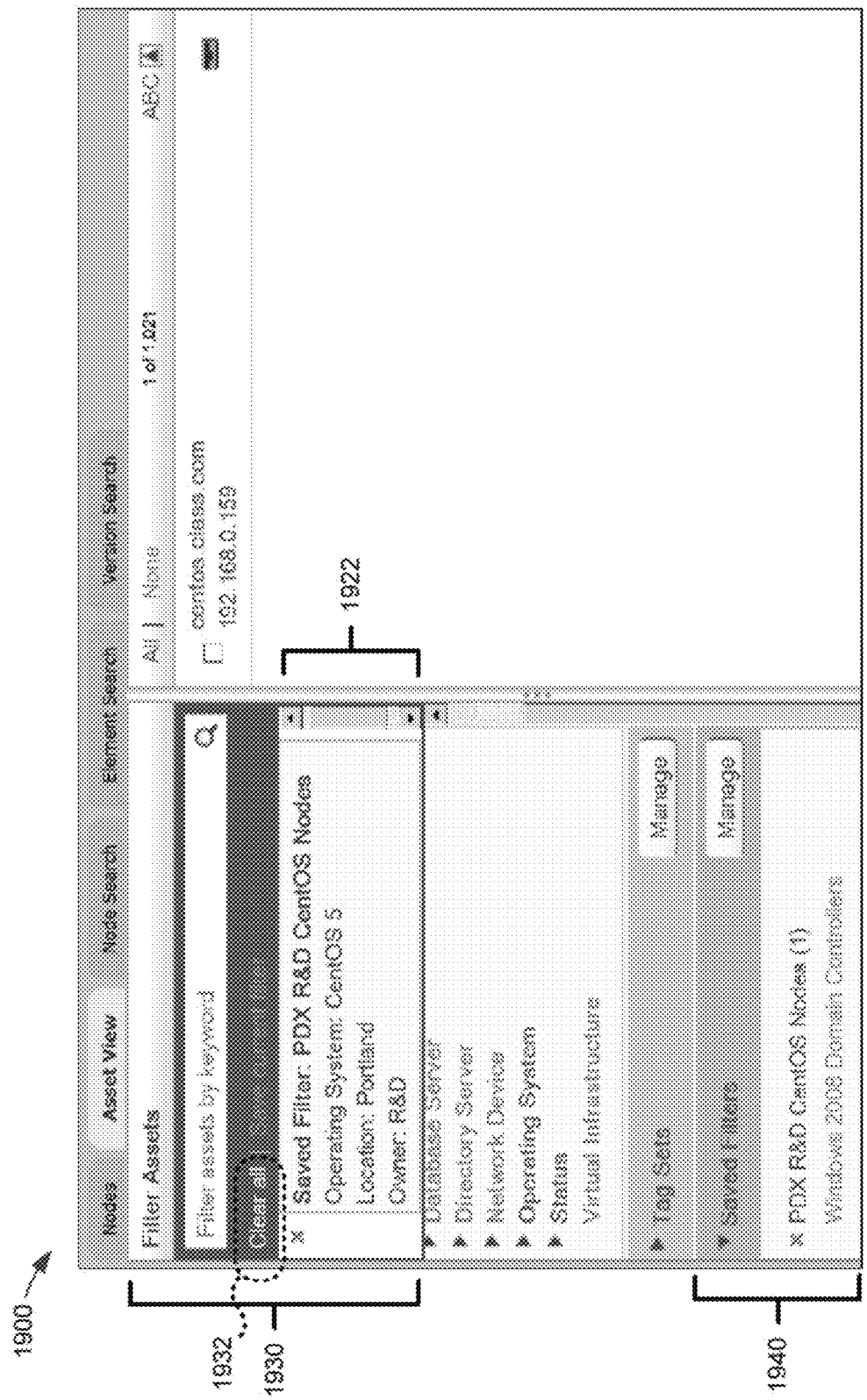

FIG. 19 is a screenshot of an asset view screen 1900 that shows a saved filter being applied. In particular, the screen 1900 shows that the saved filter 1922 entitled "PDX R&D CentOs Nodes" is currently being applied in an asset filter area 1930. The asset filter area 1930 includes the criteria for the filter as well as an option to "clear all" the criteria (e.g., by selecting clear all button 1932). A user can also clear the criteria from the asset filter area 1930 by selecting either "x" indicator shown to the left of the filter beneath the keyword filter field or "x" indicator to the left of the selected saved filter in saved filters display 1940.

Figure 20:
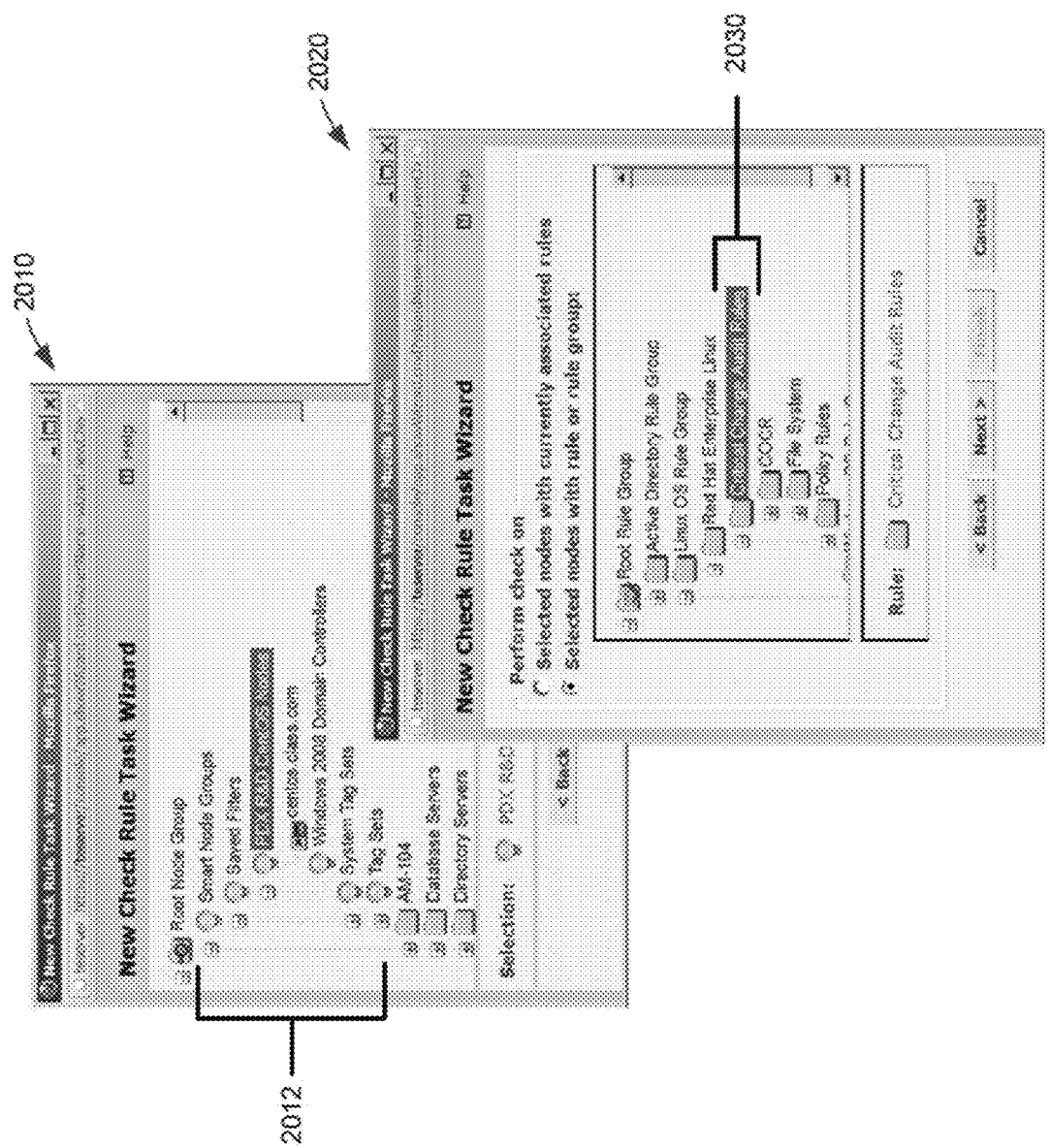

In certain embodiments, like tags and tag sets, saved filters can automatically create node groups (and/or link nodes matching the filter to the group) that can be accessed through the hierarchically arranged database or file system that is used by an underlying compliance and configuration control tool (e.g., Tripwire Enterprise). This automatic creation of corresponding groups in the hierarchical database or file system used by the underlying compliance and configuration control tool can allow a user to enjoy the benefits of tag-based management (which can offer much more efficient and robust grouping capabilities) with the benefits available in the compliance and configuration control tool. For instance, as one example, tasks and policies can be scoped to the created node groups, thereby reducing administrative efforts and increasing monitoring and policy compliance capabilities. FIG. 20 includes a screenshot 2010 of a hierarchically arranged node tree of a compliance and configuration control tool that shows node groups 2012 created using an embodiment of the disclosed asset manager. As seen, the node groups include "saved filters", "system tag sets", and "tag sets" as described above. In other embodiments more, fewer, or different node groups can be used. Furthermore, a user can navigate the hierarchical tree to identify one or more node groups or nodes to which a configuration or compliance rule is to be applied. FIG. 20 also shows a screenshot 2020 of a rule group 2030 ("Critical Change Audit Rules") being selected for application to a node group selected from screen 2010. This example illustrates how embodiments of the disclosed technology can be used to increase the ease with which node groups are created and managed, but still used within another work environment (e.g., within the environment of the underlying compliance and configuration control tool).

Examples of Asset Health Displays and Methods

In some embodiments, the asset view interfaces can also be used to monitor and manage the "health" of an asset. For example, the interfaces can be adapted to show additional information indicative of whether a node is communicating without errors with the asset manager and/or the compliance and configuration control tool. In certain embodiments, the health of a node can be monitored and updated (if appropriate) each time the node attempts to communicate with the compliance and configuration control tool (e.g., Tripwire Enterprise) and/or with the asset manager. For example, the health of a node can be monitored each time that the node attempts to communicate during a version check, promotion, or baseline operation. In particular implementations, the healthy nodes are automatically tagged as a "healthy asset" and included in a "health" tag set that appears in the asset view interface. Further, a node that is not healthy can be automatically tagged with one or more tags that are indicative of the type of error experienced by the node.

In certain implementations, one or more of the following error types can be detected and used to tag the node: connection error, incompatible agent error, out of sync error, rule run error, task timeout error, or an uncategorized error. A connection error is typically caused when monitoring agent software at the node is not running, when the system being monitored is not running, or when the username, password, port number, or other connection information specified for the node is incorrect. This type of error can typically be corrected by an IT administrator making sure that the agent and related systems are running and making sure that the information for the node is current. An incompatible agent error is typically caused by a software update to the compliance and configuration control tool that creates a situation in which the data on the node is no longer compatible with the new version of the compliance and configuration control tool software. This type of error can typically be corrected by an IT administrator restarting or updating the agent software to refresh the data at the identified nodes. An out of sync error is typically caused by a loss of connection between the console running a compliance and configuration control tool and an agent at a node during a baseline or version check. This type of error can typically be corrected by an IT administrator restarting or updating the agent software to refresh the data at the identified nodes. A rule run error is typically caused by a rule timing out during a baseline operation or version check, or when a rule attempts to query a database table that does not exist. This type of error can typically be corrected by an IT administrator reviewing the details of the error (e.g., in the selection information pane of the asset view interface) and taking corrective action (e.g., adjusting the rule applied by the compliance and configuration control tool). A task timeout error is typically caused by a task being executed at the node (e.g., via agent software controlled by the compliance and configuration control tool) exceeding a maximum timeout setting. This type of error can typically be corrected by an IT administrator increasing the task timeout setting or splitting the task into several smaller tasks. An uncategorized error is an error that does not fit into any of the other error categories. Typically, to resolve this type of error, an IT administrator will review the details of the error (e.g., in the selection information pane of the asset view interface) and determine the proper corrective action. Further, in certain implementations, uncategorized errors are not automatically cleared from the asset view interface once resolved and instead must be manually cleared. When an error is cleared, the asset is re-tagged with the "healthy asset" tag such that it appears as healthy in the "health" tag set.

In particular implementations, when an error is detected at a node, an asset manager tool can make the following changes: the node's health tag can be changed to reflect the type of error, a visual indicator of the health of the node can be displayed in the asset list pane (e.g., a red or pink shaded indicator can appear next to the asset), and details about the error can be displayed in the selection information pane when the node is selected. In some implementations, the error is also logged in an error log. Further, in certain implementations, the selection information pane shows a history of error messages (e.g., the last ten error messages that are less than two weeks old, or some other number of messages or historical period). The error messages can be cleared by the user, if desired.

Figure 25:
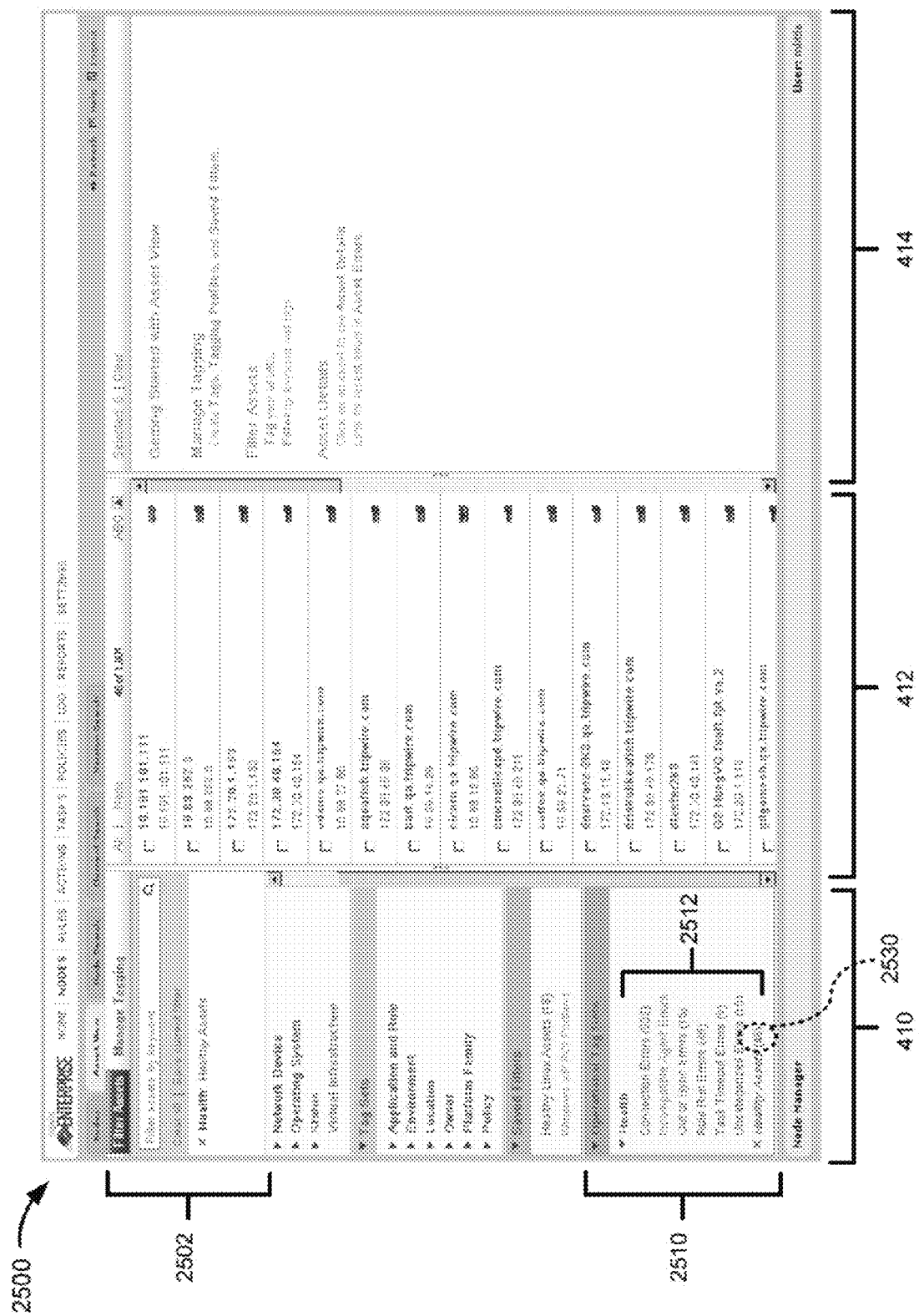
FIGS. 25-26 are screenshots from example implementations of the disclosed technology and illustrating asset health monitoring features of the tag-based asset managing and classifying techniques that can be realized in embodiments of the of the disclosed technology.
Figure 26:
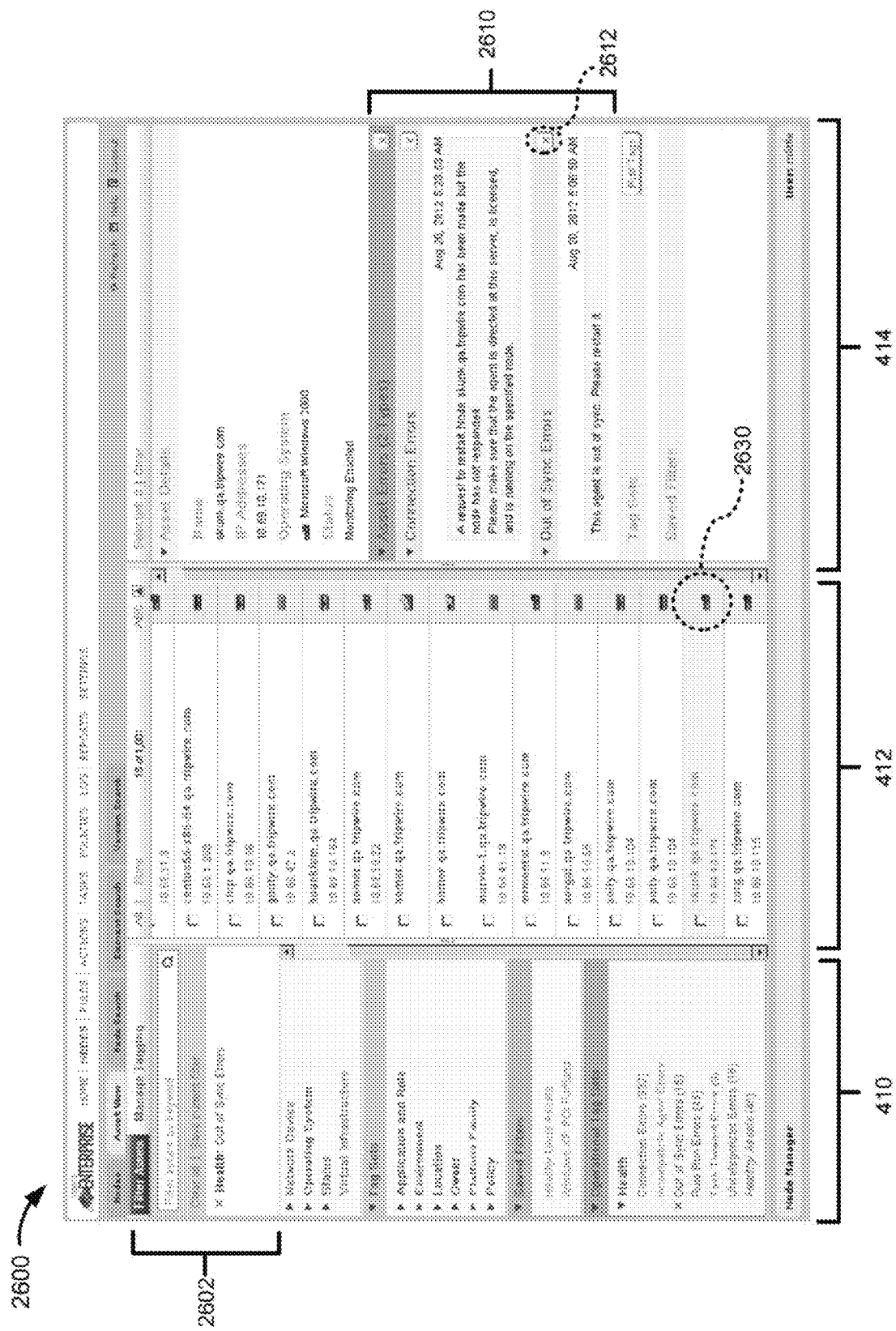

FIGS. 25 and 26 are screenshots of an exemplary embodiment of an asset view interface having an asset health tagging capability as described above. FIG. 25 is a screenshot of an exemplary asset view interface 2500 that includes asset health information. For example, asset filter pane 410 includes an expandable "operational tag sets" group 2510 that includes an expandable "health" tag set 2512. As seen in FIG. 25, the health tag set 2512 is expanded to show the "healthy assets" tag along with additional tags for each available error category (e.g., one or more of the categories disclosed above). Additionally, the number of nodes associated with each error category or as being a healthy asset is displayed next to each tag (e.g., parenthetical 2530 indicates that there are "46" nodes tagged as "healthy assets"). In the example shown in FIG. 25, the filter criterion in asset filter area 2502 indicates that the nodes displayed in the asset list pane 412 are nodes are tagged as "healthy assets".

FIG. 26 is a screenshot of an exemplary asset view interface 2600 in which detailed error information is displayed in the selection information pane 414 when an unhealthy asset is selected in the asset list pane 412. In particular, the selection information pane 414 includes an expandable error reporting section 2610 in which information about two detected errors experienced by the selected node is reported. In the illustrated example, a "connection error" and an "out of sync error" are reported. As seen in the error reporting section 2610, additional information about the error and information about how the error can be corrected are displayed. Additionally, the error reporting section and each individual error have "clear" buttons (e.g., "x" button 2612) that can be used to dismiss the error(s). When dismissed, the actual condition behind the error will remain unaffected, but the error tag within the asset view interface will be removed from the asset. If the dismissed error is the only error, the asset will be re-tagged as a healthy asset. This ability to dismiss errors gives the IT administrator greater flexibility in managing detected errors and focusing only on those errors that are important. For example, an IT administrator might dismiss a connection error if they know that a connection has been restored to an asset, or if the connection problem is understood and anticipated. Also shown in FIG. 26 are the results in asset list pane 412 of assets that are filtered according to a tag set for an error category. In particular, asset filter area 2602 indicates that the filter criterion is to display nodes that are tagged with the "out of sync errors" tag. Consequently, all the assets displayed in the asset list pane 412 have out of sync errors. Furthermore, in the illustrated embodiment, the unhealthy nodes in the asset list pane 412 are further shown as being unhealthy through some visual indicator. In FIG. 26, for example, the unhealthy nodes have an associated visual indicator (e.g., a red or pink colored box, such as box 2630) in the asset list pane 412.

V. CONCLUDING REMARKS

The particular interfaces, features, and capabilities illustrated by the screenshots in FIGS. 4-20 should not be construed as limiting, as the technology can be implemented using a wide variety of different programs, interfaces, features and capabilities.

Having illustrated and described the principles of the disclosed technology, it will be apparent to those skilled in the art that the disclosed embodiments can be modified in arrangement and detail without departing from such principles. For example, any one or more aspects of the disclosed technology can be applied in other embodiments. In view of the many possible embodiments to which the principles of the disclosed technologies can be applied, it should be recognized that the illustrated embodiments are only preferred examples of the technologies and should not be taken as limiting the scope of the invention.

What is claimed is:

1. A computer-implemented method, comprising:
receiving a plurality of sets of conditions to establish a tagging profile, each of the sets of conditions specifying a respective set of one or more conditions that must be satisfied by a node before the node is assigned a respective tag of a plurality of tags associated with the tagging profile, a first set of conditions of the plurality of sets of conditions including a geographic location for the node, and a second set of conditions of the plurality of sets of conditions including only one or more characteristics different than the geographic location for the node;
receiving identifications of the plurality of tags associated with the tagging profile;
applying the tagging profile to nodes in an information technology network, the applying the tagging profile comprising assigning one or more of the tags of the plurality of tags associated with the tagging profile to one or more nodes of the nodes in the information technology network that satisfy the respective sets of conditions specified in the tagging profile, thereby generating a tagged set of nodes; and
generating a data set in a database or file system arranged according to a hierarchical tree model that comprises the tagged set of nodes, wherein at least a first node in the tagged set of nodes satisfies both the first set of conditions and the second set of conditions, wherein the hierarchical tree model has a parent node being a tag associated with the first set of conditions, a first child node being a child of the parent node and comprising a tag associated with the second set of conditions, and a second child node being a child of the first child node and comprising the first node in the tagged set of nodes,
wherein the method is performed by a monitoring computer in the information technology network,
wherein the method further comprises applying a rule to the tagged set of nodes in the data set, the rule being applied by software agents at the nodes and identifying a criterion by which a configuration change to the node and detected by the software agent is to be transmitted to the monitoring computer, and
wherein each tag is a keyword or term, and the assigning the tag to one or more nodes comprises storing the keyword or term of the tag as metadata or as a field in a database storing nodal information for the information technology network.

2. The method of claim 1, further comprising accessing the data set comprising the tagged set of nodes with an information technology compliance and configuration control tool.

3. The method of claim 1, wherein each tag is a keyword or term, and the assigning the tag to one or more nodes comprises storing the keyword or term of the tag as metadata or as a field in a database storing nodal information for the information technology network.

4. The method of claim 1, further comprising providing a user interface, wherein the receiving a set of conditions or the receiving identifications of one or more tags is via the user interface.

5. A method implemented by a monitoring computer in an information technology network, the method comprising:
receiving a plurality of sets of conditions to establish a tagging profile, each of the sets of conditions specifying a respective set of one or more conditions that must be satisfied by a node before the node is assigned a respective tag of a plurality of tags associated with the tagging profile, a first set of conditions of the plurality of sets of conditions including a geographic location for the node, and a second set of conditions of the plurality of sets of conditions including only one or more characteristics different than the geographic location for the node;
receiving identifications of the plurality of tags associated with the tagging profile;
assigning one or more of the tags of the plurality of tags associated with the tagging profile to one or more nodes of the nodes in the information technology network that satisfy the respective sets of conditions specified in the tagging profile, thereby generating a tagged set of nodes;
generating a data set in a database or file system arranged according to a hierarchical tree model that comprises the tagged set of nodes, wherein at least a first node in the tagged set of nodes satisfies both the first set of conditions and the second set of conditions, wherein the hierarchical tree model has a parent node being a tag associated with the first set of conditions, a first child node being a child of the parent node and comprising a tag associated with the second set of conditions, and a second child node being a child of the first child node and comprising the first node in the tagged set of nodes;

transmitting, by the monitoring computer, a rule to a monitored node of the tagged set of nodes; and receiving, by the monitoring computer, notification of a configuration change to the monitored node, wherein the configuration change to the node is detected by a software agent at the monitored node.

6. The method of claim 5, further comprising allowing a user to select whether the tagging profile is to be applied to a newly detected node in the information technology network automatically or manually.

7. The method of claim 5, wherein the nodes to which the tagging profile is applied comprise one or more of a database server, directory server, file server, or network device.

8. The method of claim 5, wherein the list of the one or more tags is displayed in a first panel of the multi-panel display and the list of the nodes associated with the respective one of the tags is displayed in a second panel of the multi-panel display.

9. The method of claim 5, wherein the one or more conditions comprise at least one of the following conditions:
that a node have a name or attribute that matches a user-selected keyword, and
that a node be tagged with a selected tag, the selected tag being different than the one or more tags associated with the tagging profile.

10. The method of claim 5, further comprising allowing a user to select whether all conditions of the set or less than all conditions of the set must be satisfied before associating nodes with the one or more tags.

11. A non-transitory computer-readable medium storing computer-executable instructions which when executed by a computer cause the computer to perform a method, the instructions comprising:
instructions that cause the computer to receive a plurality of sets of conditions to establish a tagging profile, each of the sets of conditions specifying a respective set of one or more conditions that must be satisfied by a node before the node is assigned a respective tag of a plurality of tags associated with the tagging profile, a first set of conditions of the plurality of sets of conditions including a geographic location for the node, and a second set of conditions of the plurality of sets of conditions including only one or more characteristics different than the geographic location for the node;
instructions that cause the computer to receive identifications of the plurality of tags associated with the tagging profile;
instructions that cause the computer to assign one or more of the tags of the plurality of tags associated with the tagging profile to one or more nodes of the nodes in the information technology network that satisfy the respective sets of conditions specified in the tagging profile, thereby generating a tagged set of nodes;
instructions that cause the computer to generate a data set in a database or file system arranged according to a hierarchical tree model that comprises the tagged set of nodes, wherein at least a first node in the tagged set of nodes satisfies both the first set of conditions and the second set of conditions, wherein the hierarchical tree model has a parent node being a tag associated with the first set of conditions, a first child node being a child of the parent node and comprising a tag associated with the second set of conditions, and a second child node being a child of the first child node and comprising the first node in the tagged set of nodes;
instructions that cause the computer to transmit a rule to a monitored node of the tagged set of nodes; and
instructions that cause the computer to receive notification of a configuration change to the monitored node, wherein the configuration change to the node is detected by a software agent at the monitored node.

12. The non-transitory computer-readable medium of claim 11, further comprising instructions that cause the computer to allow a user to select whether the tagging profile is to be applied to a newly detected node in the information technology network automatically or manually.

13. The non-transitory computer-readable medium of claim 11, wherein the nodes to which the tagging profile is applied comprise one or more of a database server, directory server, file server, or network device.

14. The non-transitory computer-readable medium of claim 11, wherein the list of the one or more tags is displayed in a first panel of the multi-panel display and the list of the nodes associated with the respective one of the tags is displayed in a second panel of the multi-panel display.

15. The non-transitory computer-readable medium of claim 11, wherein the one or more conditions comprise at least one of the following conditions:
that a node have a name or attribute that matches a user-selected keyword, and
that a node be tagged with a selected tag, the selected tag being different than the one or more tags associated with the tagging profile.

16. The non-transitory computer-readable medium of claim 11, further comprising instructions that cause the computer to allow a user to select whether all conditions of the set or less than all conditions of the set must be satisfied before associating nodes with the one or more tags.

\* \* \* \* \*